US012360633B2

(12) United States Patent
Kim et al.

(10) Patent No.: US 12,360,633 B2
(45) Date of Patent: Jul. 15, 2025

(54) WIRELESS POWER TRANSMITTING APPARATUS INCLUDING USER INTERFACE AND METHOD FOR DETERMINING WHETHER TOUCH INPUT OF WIRELESS POWER TRANSMITTING APPARATUS HAS OCCURRED

(71) Applicant: SAMSUNG ELECTRONICS CO., LTD., Suwon-si (KR)

(72) Inventors: Hwasung Kim, Suwon-si (KR); Hyosu Byun, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/644,132

(22) Filed: Apr. 24, 2024

(65) Prior Publication Data

US 2024/0272746 A1 Aug. 15, 2024

Related U.S. Application Data

(63) Continuation of application No. PCT/KR2022/020280, filed on Dec. 13, 2022.

(30) Foreign Application Priority Data

Jan. 26, 2022 (KR) .................. 10-2022-0011795
Jul. 8, 2022 (KR) .................. 10-2022-0084648

(51) Int. Cl.
*G06F 3/041* (2006.01)
*G06F 3/0488* (2022.01)
*G06F 3/044* (2006.01)

(52) U.S. Cl.
CPC .......... *G06F 3/0418* (2013.01); *G06F 3/0488* (2013.01); *G06F 3/044* (2013.01)

(58) Field of Classification Search
CPC ...... G06F 3/0418; G06F 3/0488; G06F 3/044; G06F 3/041; H05B 2213/06; H05B 6/1236

See application file for complete search history.

(56) References Cited

U.S. PATENT DOCUMENTS 5,345,807 A * 9/1994 Butts ................. G01L 1/144
73/1.15
7,681,458 B2 3/2010 Chang et al.
(Continued)

FOREIGN PATENT DOCUMENTS

JP 5158492 B2 3/2013
JP 6123590 B2 5/2017
(Continued)

OTHER PUBLICATIONS

International Search Report mailed Mar. 24, 2023 for PCT/KR2022/020280.
(Continued)

*Primary Examiner* — David D Davis
(74) *Attorney, Agent, or Firm* — CANTOR COLBURN LLP

(57) ABSTRACT

A wireless power transmission apparatus includes a user interface configured to receive a user input through touch sensors, a memory, and a processor. The processor may obtain touch data values corresponding to the touch sensors, respectively. The processor may obtain an average touch data value of the touch sensors, based on the touch data values. The processor determines a variable threshold value with respect to a touch sensor from among the touch sensors, and the variable threshold value is obtained by adding, to the average touch data value, a default threshold value corresponding to the touch sensor. The processor determines whether or not a touch input is generated with respect to the touch sensor, based on a result of comparing a touch data (Continued)

value with respect to the touch sensor with the variable threshold value with respect to the touch sensor.

15 Claims, 28 Drawing Sheets

(56) References Cited

U.S. PATENT DOCUMENTS

| | | |
|---|---|---|
| 8,547,351 B2 | 10/2013 | Yamauchi et al. |
| 8,963,879 B2 | 2/2015 | Chen et al. |
| 9,417,730 B2 | 8/2016 | Shin |
| 9,830,018 B2 | 11/2017 | Lu et al. |
| 9,983,731 B2 | 5/2018 | Gao et al. |
| 10,345,976 B2 | 7/2019 | Fang et al. |
| 11,073,944 B2 | 7/2021 | Choo et al. |
| 2012/0242617 A1 | 9/2012 | Lee |
| 2014/0139478 A1 | 5/2014 | Lee et al. |
| 2016/0216803 A1 | 7/2016 | Tanaka |
| 2018/0046319 A1* | 2/2018 | Luo .................. G06F 3/044 |
| 2020/0326812 A1 | 10/2020 | Choo et al. |

FOREIGN PATENT DOCUMENTS

| | | |
|---|---|---|
| JP | 6429112 B2 | 11/2018 |
| JP | 2019175023 A | 10/2019 |
| JP | 6613657 B2 | 12/2019 |
| KR | 20100029421 A | 3/2010 |
| KR | 20100040518 A | 4/2010 |
| KR | 101148297 B1 | 5/2012 |
| KR | 20120109027 A | 10/2012 |
| KR | 101385481 B1 | 4/2014 |
| KR | 101388699 B1 | 4/2014 |
| KR | 101419251 B1 | 7/2014 |
| KR | 101509354 B1 | 4/2015 |
| KR | 20180045632 A | 5/2018 |
| KR | 102033060 B1 | 10/2019 |
| KR | 20200121203 A | 10/2020 |
| KR | 20210079999 A | 6/2021 |

OTHER PUBLICATIONS

The extended European search report for EP Application No. 22924379.5 mailed on Jan. 30, 2025, citing the above reference(s).

* cited by examiner

WIRELESS POWER TRANSMITTING APPARATUS INCLUDING USER INTERFACE AND METHOD FOR DETERMINING WHETHER TOUCH INPUT OF WIRELESS POWER TRANSMITTING APPARATUS HAS OCCURRED

TECHNICAL FIELD

The disclosure relates to a wireless power transmission apparatus including a user interface, and a method, performed by the wireless power transmission apparatus, of determining whether or not a touch input is generated.

BACKGROUND ART

An induction range is a heating apparatus for cooking that uses an induction heating principle and is commonly referred to as an induction device. An induction range has little oxygen consumption compared with a gas range and emits no waste gas, and thus, may reduce indoor air contamination and an indoor temperature rise. In addition, an induction range uses an indirect method of inducing heat from a heating object, thereby having high energy efficiency and stability, and while the heating object emits heat, a contact surface is not heated, and thus, the risk of burns is low. Thus, recently, the demand for induction ranges has continuously increased.

For convenience of manipulation by a user, the induction range may include a user interface, e.g., a plurality of touch sensors. The user may touch the plurality of touch sensors to turn the induction range off or on, select a cooker, and adjust a power level of the cooker.

When the touch sensors sense touch inputs based on a capacitance method, capacitances of the touch sensors may be changed when a finger of the user touches the touch sensors, and based on the changed capacitances, the induction range may determine whether or not a touch input of the user is generated.

However, the capacitances of the touch sensors may also be changed by an abnormal touch of another dielectric, in addition to a finger of the user. When microfluidic particles, such as wet steam generated in a cooking vessel such as a pot heated by the cooker of the induction range, land on the touch sensors, for example, the capacitances of the touch sensors may be changed. The capacitance-type touch sensors may react to an unintentional touch by the user.

SUMMARY

In an embodiment of the disclosure, a wireless power transmission apparatus may include a user interface configured to receive a user input through a plurality of touch sensors, a memory, and at least one processor. The at least one processor may be configured to obtain touch data values corresponding to the plurality of touch sensors, respectively. The at least one processor may be configured to obtain an average touch data value of the plurality of touch sensors, based on the touch data values. The at least one processor may be configured to determine a variable threshold value with respect to at least one touch sensor from among the plurality of touch sensors, the variable threshold value being obtained by adding, to the average touch data value, a default threshold value corresponding to the at least one touch sensor. The at least one processor may be configured to determine whether or not a touch input is generated with respect to the at least one touch sensor, based on a result of comparing a touch data value with respect to the at least one touch sensor with the variable threshold value with respect to the at least one touch sensor.

In an embodiment of the disclosure, a method, performed by a wireless power transmission apparatus, of determining whether or not a touch input is generated includes obtaining touch data values corresponding to a plurality of touch sensors, respectively. The method further includes, obtaining an average touch data value of the plurality of touch sensors, based on the touch data values. The method further includes determining a variable threshold value with respect to at least one touch sensor from among the plurality of touch sensors, the variable threshold value being obtained by adding, to the average touch data value, a default threshold value corresponding to the at least one touch sensor. The method further includes determining whether or not a touch input is generated with respect to the at least one touch sensor, based on a result of comparing a touch data value with respect to the at least one touch sensor with the variable threshold value with respect to the at least one touch sensor.

DESCRIPTION OF DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
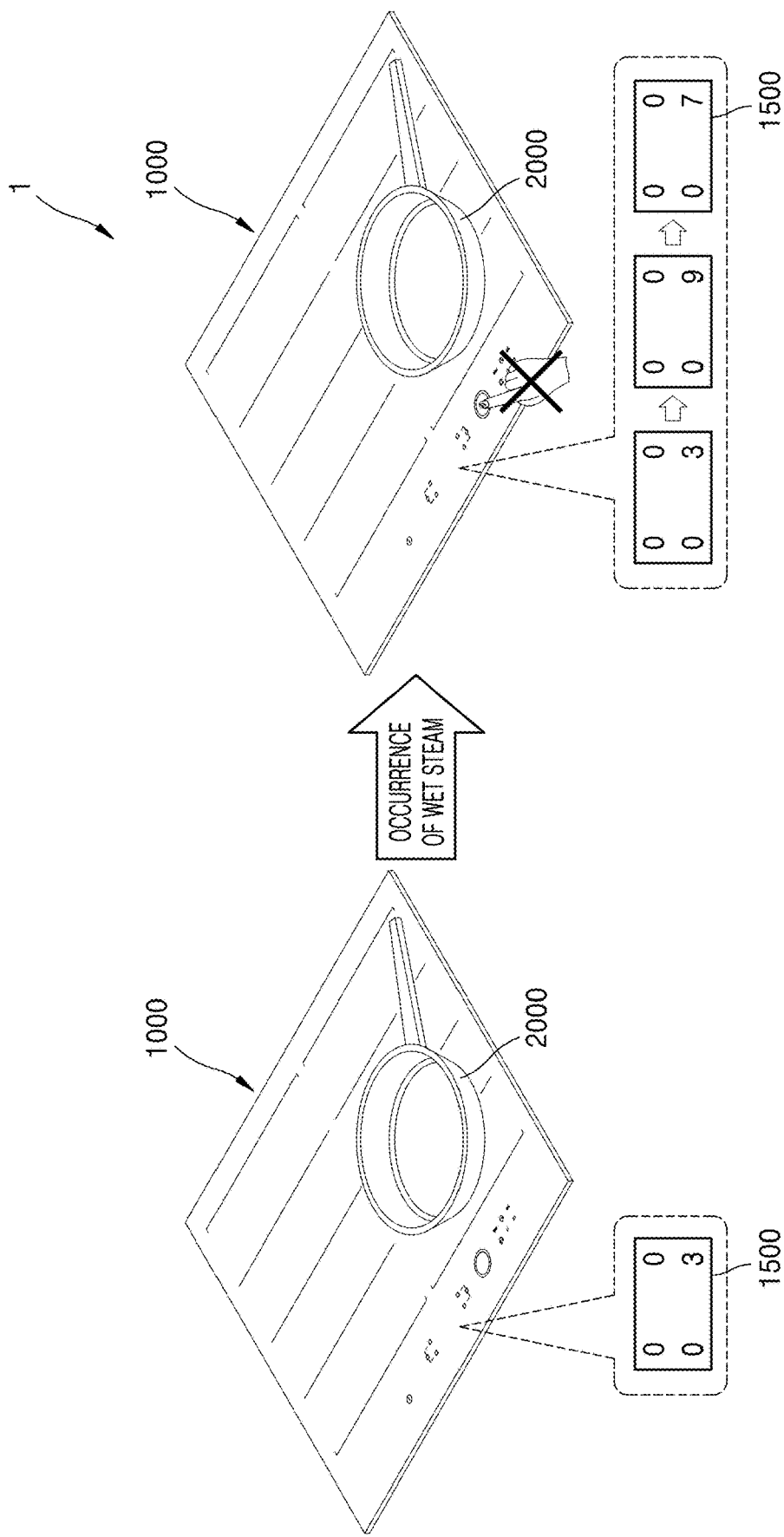
FIG. 1 is a diagram of an embodiment of a cooking system according to the disclosure.

The terms used herein will be briefly described, and then an embodiment of the disclosure will be described in detail.

In the disclosure, general terms that are widely used nowadays are selected, when possible, in consideration of functions of an embodiment of the disclosure, but non-general terms may be selected according to the intention of one of ordinary skill in the this art, precedents, or the advent of new technologies, etc. Also, in particular cases, some terms may be arbitrarily chosen by the applicant of the disclosure. In this case, the meanings of these terms will be explained in corresponding parts of an embodiment of the disclosure in detail. Thus, the terms used herein should be defined not based on the names thereof but based on the meanings thereof and content throughout the disclosure.

Throughout the disclosure, the expression "at least one of a, b or c" indicates only a, only b, only c, both a and b, both a and c, both b and c, all of a, b, and c, or variations thereof.

Throughout the disclosure, when a part "includes" or "comprises" an element, unless there is a particular description contrary thereto, the part may further include other elements, not excluding the other elements. Also, the terms, such as "unit" or "module," used in the disclosure, should be understood as a unit that processes at least one function or operation and that may be embodied in a hardware manner, a software manner, or a combination of the hardware manner and the software manner.

Hereinafter, embodiments of the disclosure will be described in detail with reference to the accompanying drawings, so that the embodiments of the disclosure may be easily implemented by one of ordinary skill in the art. However, an embodiment of the disclosure may have different forms and should not be construed as being limited to the embodiments of the disclosure described herein. Also, in the drawings, parts not related to descriptions are omitted for the clear description of an embodiment of the disclosure, and throughout the specification, like reference numerals are used for like elements.

FIG. 1 is a diagram of an embodiment of a cooking system 1 according to the disclosure.

Referring to FIG. 1, the cooking system 1 in an embodiment of the disclosure may include a wireless power transmission apparatus 1000 and a cooking device 2000.

The wireless power transmission apparatus 1000 in an embodiment of the disclosure may be an apparatus wirelessly transmitting power to a heating object (e.g., the cooking device 2000) provided on a top plate by electromagnetic induction. The wireless power transmission apparatus 1000 may also be also referred to as an induction range, an electric range, or a wireless power transmission apparatus. The wireless power transmission apparatus 1000 may include an operating coil generating a magnetic field for induction heating the cooking device 2000.

To wirelessly transmit power may denote to transmit power to a receiving coil or an induction heating metal (e.g., an iron component) by an induced magnetic field, based on an induction heating method. In an embodiment, the wireless power transmission apparatus 1000 may apply a current to an operating coil (a transmitting coil) to form a magnetic field, for example, so that an eddy current is generated in the cooking device 2000, or the magnetic field is induced in the receiving coil.

In an embodiment of the disclosure, the wireless power transmission apparatus 1000 may include a plurality of operating coils. In an embodiment, when a top plate of the wireless power transmission apparatus 1000 includes a plurality of cooking zones (or cookers), the wireless power transmission apparatus 1000 may include a plurality of operating coils corresponding to the plurality of cooking zones, respectively, for example.

The top plate of the wireless power transmission apparatus 1000 in an embodiment of the disclosure may include tempered glass, such as ceramic glass, etc., that is not easily damaged. Also, a guide mark for guiding a cooking zone in which the cooking device 2000 is to be disposed may be formed on the top plate of the wireless power transmission apparatus 1000.

In an embodiment of the disclosure, the wireless power transmission apparatus 1000 may include a communication interface for performing communication with an external device. In an embodiment, the wireless power transmission apparatus 1000 may perform communication with the cooking device 2000 or a server through the communication interface, for example.

The communication interface may include a short-range wireless communicator, a mobile communicator, etc. The short-range wireless communicator may include a Bluetooth communicator, a Bluetooth low energy (BLE) communicator, a near-field communicator (NFC), a wireless local area network (WLAN) (or Wifi) communicator, a Zigbee communicator, an infrared data association (IrDA) communicator, a Wifi direct (WFD) communicator, an ultra wideband (UWB) communicator, an Ant+ communicator, etc., but is not limited thereto.

The cooking device 2000 may be a device for heating a content contained in the cooking device 2000. In an embodiment, the cooking device 2000 may include a kettle, a teapot, a coffee pot, a rice cooker, a pot, a frying pan, a steamer, etc., for example, but is not limited thereto. The cooking device 2000 may include a cooker device. The cooker device may be a device into or from which a general induction heating (IH) container may be inserted or detached. In an embodiment of the disclosure, the cooker device may be a device capable of automatically cooking a content, according to a recipe. The cooker device may also be also referred to as a pot, a rice cooker, a steamer, etc. according to a usage. In an embodiment, when an inner pot for cooking rice is inserted into the cooker device, the cooker device may be also referred to as a rice cooker, for example. The cooking device 2000 may include various forms of containers which may be induction heated by the wireless power transmission apparatus 1000 while having a magnetic property for communication with the wireless power transmission apparatus 1000. In this specification, the cooking device 2000 is illustrated as a frying pan, for example, but the cooking device 2000 is not limited thereto.

In an embodiment of the disclosure, the wireless power transmission apparatus 1000 may receive a user input or may output information through a user interface 1500. In an embodiment, the user interface 1500 may be formed as a touch panel 1530 (of FIG. 2) including a display and a plurality of touch sensors, for example. Each of the plurality of touch sensors may be connected to a touch button (or a touch key). That is, the plurality of touch sensors may be mapped with touch buttons, respectively. When a user selects a predetermined touch button, a touch sensor mapped with the predetermined touch button may recognize a touch by the user. The user may change a power level, book a cooking time, or stop power transmission of the wireless power transmission apparatus 1000, through the plurality of touch sensors. FIG. 1 illustrates that the wireless power transmission apparatus 1000 has four cookers, and the display displays a power level of each of the cookers. However, the wireless power transmission apparatus 1000 is not limited thereto.

In an embodiment of the disclosure, the user interface 1500 for receiving a user input may include a plurality of touch sensors and may determine whether or not a touch input of a user is generated, by a capacitance method. When a finger of the user approaches or touches the touch sensor, a capacitance of the touch sensor may be changed, and the wireless power transmission apparatus 1000 may determine whether or not a touch input of the user is generated according to the changed capacitance. Thus, the user may select a cooking zone of the wireless power transmission apparatus 1000 and change a heating temperature of the cooking zone, by touching the touch sensor of the wireless power transmission apparatus 1000. Hereinafter, the touch input includes a case in which a part (e.g., a finger) of a human body of a user touches or approaches an object.

When the cooking device 2000 is heated on the top plate of the wireless power transmission apparatus 1000, microfluidic particles, such as vapor, may be generated from the cooking device 2000. When the microfluidic particle falls down on the touch sensor of the top plate of the wireless power transmission apparatus 1000, a capacitance of the touch sensor may rise, and a touch data value recognized by the wireless power transmission apparatus 1000 may increase. Accordingly, even when a user's normal touch input does not occur, the wireless power transmission apparatus 1000 may incorrectly determine that there is a user's touch input. An operation of the wireless power transmission apparatus 1000 for calculating the touch data value according to the capacitance will be described in detail below with reference to FIG. 7.

The microfluidic particle may be a liquid gas in the form of vapor, which includes components, such as water, oil, etc., and may be a dielectric for increasing a capacitance. Hereinafter, the microfluidic particle may be indicated as vapor or wet steam. The disclosure is not limited thereto, but generally, microfluidic particles may slowly reach down on a wide zone of the top plate of the wireless power transmission apparatus 1000.

In an embodiment, when wet steam falls down on the touch sensor of the top plate of the wireless power transmission apparatus 1000, the wireless power transmission apparatus 1000 may incorrectly recognize that a user attempts to change a power level of a cooking zone of a fourth quadrant, even when there is no touch by the user for adjusting the power level of the cooking zone of the fourth quadrant, for example. Accordingly, the wireless power transmission apparatus 1000 may change the power level of the cooking zone of the fourth quadrant, according to an input for changing the power level of the cooking zone of the fourth quadrant (e.g., power levels 3→9→7).

In an embodiment of the disclosure, the wireless power transmission apparatus 1000 may flexibly change a criterion point for determining whether or not a touch input is generated, by taking into account a feature that a capacitance of the touch sensor may increase due to an unintentional abnormal touch by a user, during an operation process of the wireless power transmission apparatus 1000. In an embodiment, the wireless power transmission apparatus 1000 may ignore a change in touch data due to an abnormal touch, by changing a threshold value, which is a criterion for a touch input, for example. Thus, a malfunction of the touch panel of the wireless power transmission apparatus 1000, caused by an unintended touch by a user, may be minimized. The wireless power transmission apparatus 1000 may change the threshold value used as the criterion for the touch input, by reflecting an average touch data value of the plurality of touch sensors. This feature will be described in detail below with reference to FIGS. 5 and 6. Hereinafter, the user interface 1500 of the wireless power transmission apparatus 1000 will be further described by referring to FIG. 2.

Figure 2:
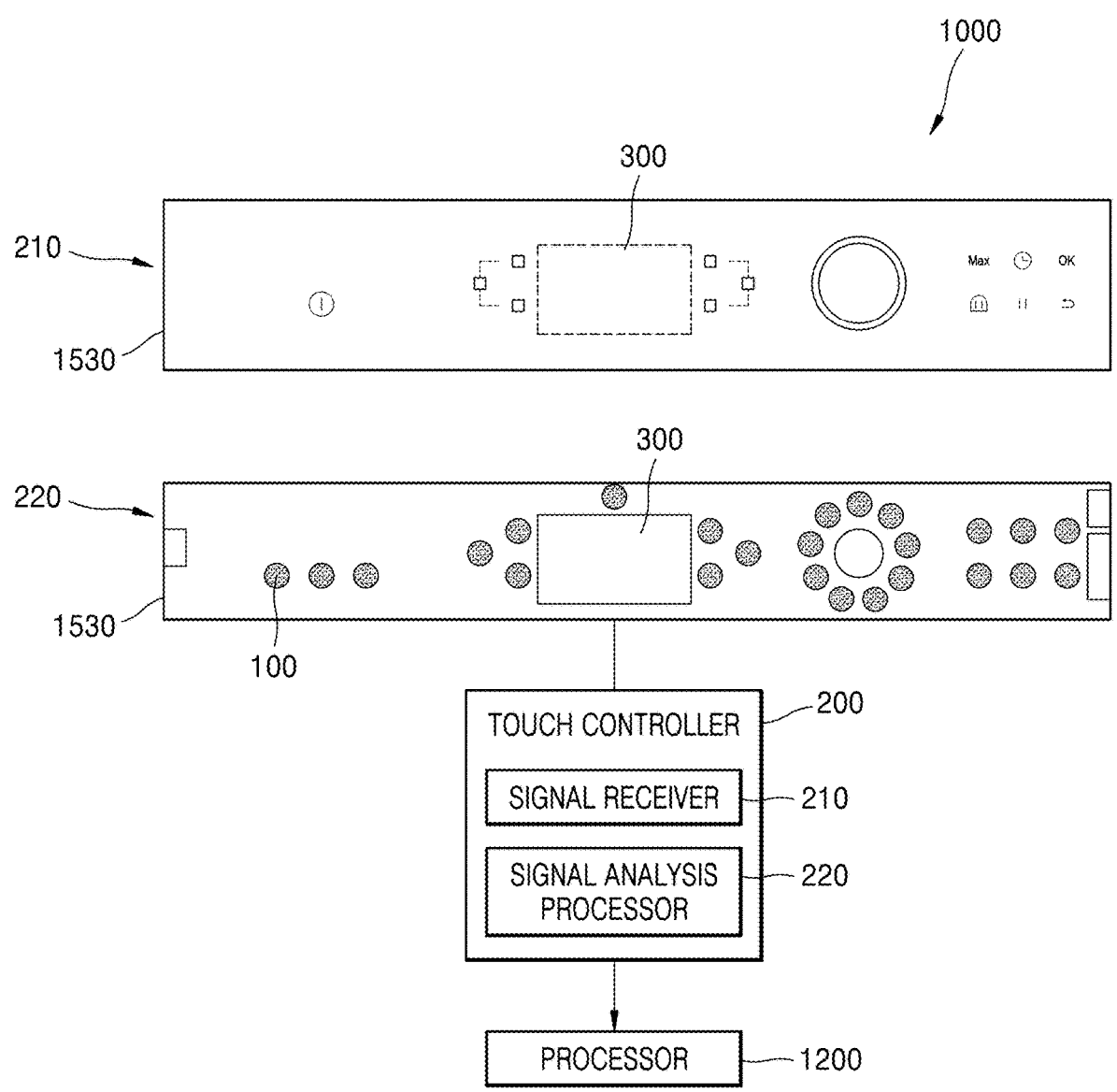
FIG. 2 is a schematic plan view of an embodiment of a touch panel and a display of a wireless power transmission apparatus according to the disclosure.

FIG. 2 is a schematic plan view of an embodiment of the touch panel 1530 and a display (e.g., display area) 300 of the wireless power transmission apparatus 1000 according to the disclosure.

The wireless power transmission apparatus 1000 in an embodiment of the disclosure may include the touch panel 1530 and the display 300. The touch panel 1530 may include a plurality of touch sensors 100. The touch panel 1530 and the display 300 may be included in the user interface 1500 of the wireless power transmission apparatus 1000. In an embodiment, the touch panel 1530 may be an input interface of the wireless power transmission apparatus 1000, and the display 300 may be an output interface of the wireless power transmission apparatus 1000, for example.

Referring to a reference numeral 210 of FIG. 2, the wireless power transmission apparatus 1000 in an embodiment of the disclosure may include a top plate including tempered glass, such as ceramic glass, etc., and the plurality of touch sensors 100 may be respectively mapped with touch buttons for guiding configured functions. In an embodiment, the configured functions may include menu selection, confirmation, cancellation, power level adjustment, cooking time reservation, a cooking pause, etc., for example.

Referring to a reference numeral 220 of FIG. 2, the wireless power transmission apparatus 1000 in an embodiment of the disclosure may include the touch panel 1530 including 25 touch sensors and one display 300. The touch sensors and the display 300 may be disposed (e.g., mounted) on a printed circuit board (PCB). The numbers and the shapes of the plurality of touch sensors 100 included in the touch panel 1530 and the display 300 are not limited to an embodiment of the disclosure. The plurality of touch sensors 100 and the display 300 may be variously modified according to configured functions of the wireless power transmission apparatus 1000.

Each of the plurality of touch sensors 100 in the touch panel 1530 may be connected to a touch controller 200. The touch controller 200 may process signals received from the plurality of touch sensors 100 into touch data values and may transmit the touch data values to a processor 1200. The processor 1200 may determine whether or not a user's touch input is generated, based on the obtained touch data values.

The plurality of touch sensors 100 may determine whether or not a user's touch input is generated, based on a capacitance method. When a finger of a user approaches or touches any one of the plurality of touch sensors 100, a capacitance of the touch sensor may be changed. The plurality of touch sensors 100 may transmit the changed capacitance to the touch controller 200. The touch controller 200 may receive the changed capacitance from the plurality of touch sensors 100.

The touch controller 200 may include a signal receiver 210 and a signal analysis processor 220. The signal receiver 210 may receive a change of capacitance of the plurality of touch sensors 100. The signal analysis processor 220 may calculate the touch data values respectively corresponding to the plurality of touch sensors 100, based on a voltage charging time varying depending on the received change of capacitance. In an embodiment, when the voltage charging time of a capacitor is changed due to the change of capacitance in any one touch sensor, the signal analysis processor 220 may analyze the changed charging time and calculate the touch data value, for example. The signal analysis processor 220 may output the calculated touch data value to the processor 1200. In an embodiment, the signal analysis processor 220 may include a charging time-measurement circuit for measuring a charging time based on a change of capacitance due to a touch input and an oscillator circuit for converting a measured charging time into a frequency change, for example.

Whenever alternating power is supplied from a power portion (not shown), the touch controller 200 may sequentially scan the plurality of touch sensors 100 according to a control signal, and may calculate the touch data value of each touch sensor.

In an embodiment, in the case of the touch panel 1530 of FIG. 2, 25 touch sensors each connected to the touch controller 200 may be sequentially scanned in the order of a first touch sensor (hereinafter, also referred to as the first touch sensor) to a twenty-fifth touch sensor (hereinafter, also referred to as the twenty-fifth touch sensor), when the alternating power is supplied from the power portion of the touch controller 200, for example. The signal receiver 210 of the touch controller 200 may transmit a capacitance received from the first touch sensor to the signal analysis processor 220, and the signal analysis processor 220 may calculate a first touch data value. Also, the signal receiver 210 of the touch controller 200 may transmit a capacitance received from the twenty-fifth touch sensor to the signal analysis processor 220, and the signal analysis processor 220 may calculate a twenty-fifth touch data value. As described above, the first touch data value calculated from the first touch sensor through the twenty-fifth touch data value calculated from the twenty-fifth touch sensor may be output to the processor 1200.

The processor 1200 may identify the touch data value of each of the plurality of touch sensors 100, received from the touch controller 200, and may determine whether or not a touch input by a user's touch is generated. The processor 1200 may identify the touch data value of each of the plurality of touch sensors 100 and may ignore a change in capacitance, caused by a change not intended by a user, e.g., wet steam. This feature will be described in detail with reference to FIG. 5.

Figure 3:
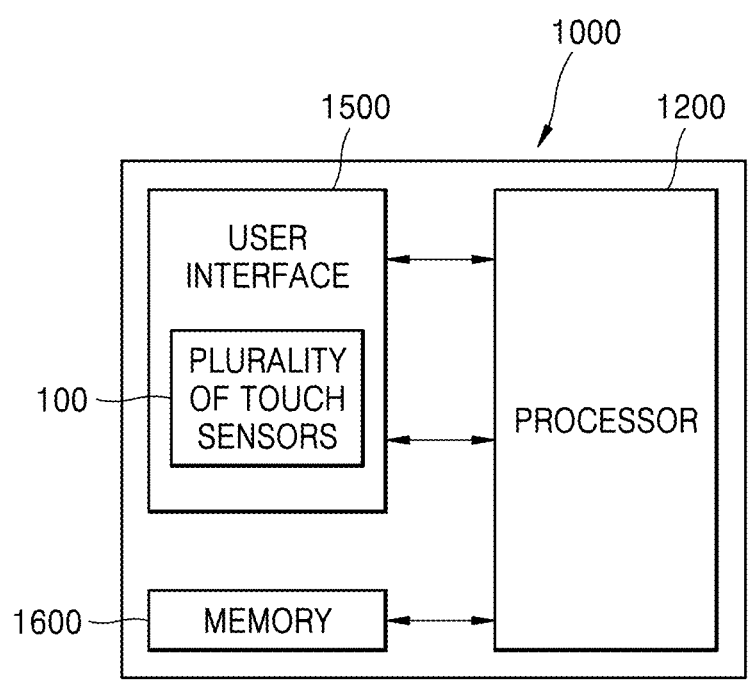
FIG. 3 is a block diagram for describing an embodiment of functions of a wireless power transmission apparatus according to the disclosure.
Figure 4:
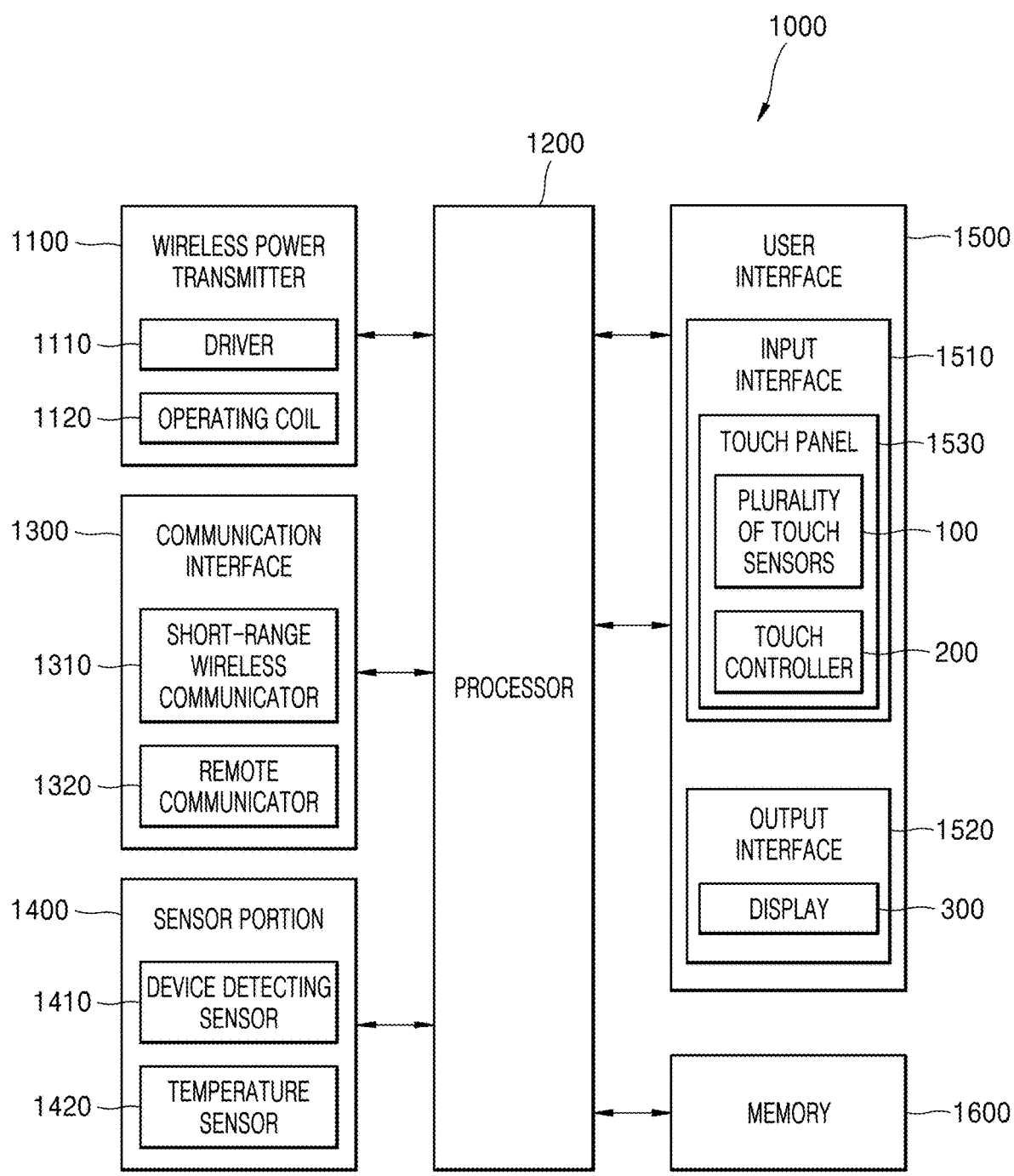
FIG. 4 is a block diagram for describing an embodiment of functions of a wireless power transmission apparatus according to the disclosure.

FIG. 3 is a block diagram for describing an embodiment of functions of the wireless power transmission apparatus 100 according to the disclosure. FIG. 4 is a block diagram for describing an embodiment of functions of the wireless power transmission apparatus 100 according to the disclosure.

Referring to FIG. 3, the wireless power transmission apparatus 1000 in an embodiment of the disclosure may include the user interface 1500, a memory 1600, and the processor 1200. However, not all components illustrated in FIG. 3 are essential components. The wireless power transmission apparatus 1000 may be realized by including more or a fewer components than the components illustrated in FIG. 3. As illustrated in FIG. 4, the wireless power transmission apparatus 1000 in an embodiment of the disclosure may include a wireless power transmitter 1100, the processor 1200, a communication interface 1300, a sensor portion 1400, the user interface 1500, and the memory 1600.

Hereinafter, the components are sequentially described.

The wireless power transmitter 1100 may include a driver 1110 and an operating coil 1120, but is not limited thereto. The driver 1110 may receive power from an external power portion and may supply a current to the operating coil 1120 in response to a driving control signal of the processor 1200. The driver 1110 may include an electro-magnetic interference (EMI) filter, a rectifier current, an inverter circuit, a current sensing circuit, and a driving processor, but is not limited thereto.

The EMI filter may block high-frequency noise included in the alternating power supplied from an external source and transmit an alternating voltage and an alternating current of a predetermined frequency (e.g., 50 hertz (Hz) or 60 Hz). The alternating power, high-frequency noise of which is blocked by the EMI filter, may be supplied to the rectifier circuit. The rectifier circuit may convert the supplied alternating power into direct power. The inverter circuit may include a switch circuit configured to supply a driving current to the operating coil 1120 or cut off a driving current to the operating coil 1120. The switch circuit may be turned on or off in response to a driving control signal of the driving processor. According to the switching circuit turned on/off, a magnitude and a direction of the current flowing through the operating coil 1120 may be changed. The current sensing circuit may include a current sensor configured to measure a current output from the inverter circuit. An electrical signal corresponding to a measured current value may be transmitted to the driving processor. The driving processor may generate the driving control signal for determining to turn on or turn off the switching circuit based on an output intensity (a power level) of the wireless power transmission apparatus 1000.

The operating coil 1120 may generate a magnetic field for heating the cooking device 2000. In an embodiment, when a driving current is supplied to the operating coil 1120, a magnetic field may be induced around the operating coil 1120, for example. When the operating coil 1120 is supplied with a current, the magnitude and the direction of which change according to time, that is, an alternating current, a magnetic field, the magnitude and the direction of which change according to time, may be induced around the operating coil 1120. The magnetic field around the operating coil 1120 may be transmitted through the top plate including tempered glass and may reach the cooking device 2000 on the top plate. Due to the magnetic field, the magnitude and the direction of which change according to time, an eddy current rotating based on the magnetic field may occur in the cooking device 2000, and due to the eddy current, electrical resistance heat may be generated in the cooking device 2000. The electrical resistance heat, which is generated in a resistor when a current flows in the resistor, may also be also referred to as Joule heat. The cooking device 2000 may be heated by the electrical resistance heat, and a content in the cooking device 2000 may be heated.

The processor 1200 may control general operations of the wireless power transmission apparatus 1000. The processor 1200 may execute programs stored in the memory 1600 to control the wireless power transmitter 1100, the communication interface 1300, the sensor portion 1400, the user interface 1500, and the memory 1600. The processor 1200 may include a plurality of processors, in an embodiment according to the disclosure. In an embodiment, the processor 1200 may include a main processor and a sub-processor, for example.

In an embodiment of the disclosure, the wireless power transmission apparatus 1000 may include an artificial intelligence (AI) processor. The AI processor may be loaded on the wireless power transmission apparatus 100 in the form of an AI-dedicated hardware chip or in the form of a portion of a previous general-purpose processor (e.g., a central processing unit (CPU) or an application processor) or a graphics dedicated processor (e.g., a graphics processing unit (GPU)).

The communication interface 1300 may include one or more components configured to enable communication between the wireless power transmission apparatus 1000 and the cooking device 2000 or between the wireless power transmission apparatus 1000 and a server device. In an embodiment, the communication interface 1300 may include a short-range wireless communicator 1310 and a remote communicator 1320, for example. The short-range wireless communicator may include a Bluetooth communicator, a BLE communicator, an NFC, a WLAN (or Wifi) communicator, a Zigbee communicator, an IrDA communicator, a WFD communicator, a UWB communicator, an Ant+ communicator, etc., but is not limited thereto. When the cooking device 200 is remotely controlled by a server device (not shown) in an Internet of things (IoT) environment, the remote communicator 1320 may be used for communication with the server device. The remote communicator 1320 may include the Internet, a computer network (e.g., a local area network (LAN) or a wide area network (WAN)), and a mobile communicator. The mobile communicator may transceive a wireless signal with at least one of a base station, an external terminal, or a server, on a mobile communication network. Here, the wireless signals may include a sound call signal, a video-telephony call signal, or various forms of data according to transmission and reception of text/multimedia. The mobile communicator may include a $3^{rd}$ generation (3G) module, a $4^{th}$ generation (4G) module, a long term evolution (LTE) module, a $5^{th}$ generation (5G) module, a $6^{th}$ generation (6G) module, an NB-IoT module, an LTE-M module, etc., but is not limited thereto.

The sensor portion 1400 may include a device detecting sensor 1410, a temperature sensor 1420, etc., but is not limited thereto. The device detecting sensor 1410 may sense the cooking device 2000 on the top plate. In an embodiment, the device detecting sensor 1410 may be implemented as a current sensor, for example, but is not limited thereto. The device detecting sensor 1410 may be implemented as at least one of a proximity sensor, a touch sensor, a weight sensor, a temperature sensor, an illuminance sensor, or a magnetic sensor.

The temperature sensor 1420 may sense a temperature of the cooking device 2000 on the top plate or a temperature of the top plate. The cooking device 2000 may be induction heated by an operating coil and may be over-heated according to a material thereof. Thus, the wireless power transmission apparatus 1000 may sense the temperature of the cooking device 2000 on the top plate or the temperature of the top plate and may block an operation of the operating coil, when the cooking device 2000 is over-heated.

The temperature sensor 1420 may include a thermistor having an electrical resistance varying depending on a temperature. In an embodiment, the temperature sensor 1420 may include a negative temperature coefficient (NTC) temperature sensor, for example, but is not limited thereto. The temperature sensor 1420 may include a positive temperature coefficient (PTC) temperature sensor.

The user interface 1500 may include an input interface 1510 and an output interface 1520.

The input interface 1510 may be configured to receive an input of a user. The input interface 1510 may include at least one of a key pad, a dome switch, a touch panel (a touch capacitance method, a pressure resistive-layer method, an infrared sensing method, a surface ultrasonic conduction method, an integral tension measurement method, a piezoelectric effect method, etc.), a jog wheel, or a jog switch, but is not limited thereto.

The input interface 1510 in an embodiment of the disclosure may include the touch panel 1530 operating based on a capacitance method. The touch panel 1530 may include the plurality of touch sensors 100 and the touch controller 200. The touch panel 1530 may receive a user's touch input through the plurality of touch sensors 100, and the touch controller 200 may calculate a touch data value according to the user's touch input.

The touch controller 200 may transmit information about a touch input of the wireless power transmission apparatus 1000 to the processor 1200. The touch controller 200 may calculate a change of capacitance received from the plurality of touch sensors 100 into a touch data value and may transmit the touch data value to the processor 1200. According to the received touch data value, the processor 1200 may determine whether or not a user's touch input is generated. The touch controller 200 may include an integrated circuit (IC) and may be disposed (e.g., mounted) on a PCB of the touch panel 1530. The output interface 1520 may be configured to output an audio signal or a video signal and may include the display 300, a sound outputter, etc. The output interface 1520 may output information indicating at least one of a power level, a cooking time, or a menu identification of the wireless power transmission apparatus 1000, through the display 300.

The display 300 may include at least one of a liquid crystal display, a thin-film transistor-liquid crystal display, a light-emitting diode (LED), an organic LED, a flexible display, a three-dimensional (3D) display, or an electrophoretic display. The memory 1600 may store a program for processing and controlling by the processor 1200 and may store input/output data (e.g., a default threshold value with respect to the touch sensor of the wireless power transmission apparatus, a variable threshold value with respect to the touch sensor, an average touch data value, etc.). The memory 1600 may store an AI model.

The memory 1600 may include at least one type of storage medium from among a flash memory-type storage medium, a hard disk-type storage medium, a multimedia card micro-type storage medium, a card-type memory (e.g., secure digital (SD) or extreme digital (XD) memory), random-access memory (RAM), static RAM (SRAM), read-only memory (ROM), electrically erasable programmable ROM (EEPROM), programmable ROM (PROM), a magnetic memory, a magnetic disk, and an optical disk. Also, the wireless power transmission apparatus 1000 may operate a web storage or a cloud server performing a storage function on the Internet.

Hereinafter, a method, performed by the wireless power transmission apparatus 1000, of determining whether or not a touch input is generated, according to a touch data value of a touch sensor, will be described with reference to FIGS. 5 and 6.

Figure 5:
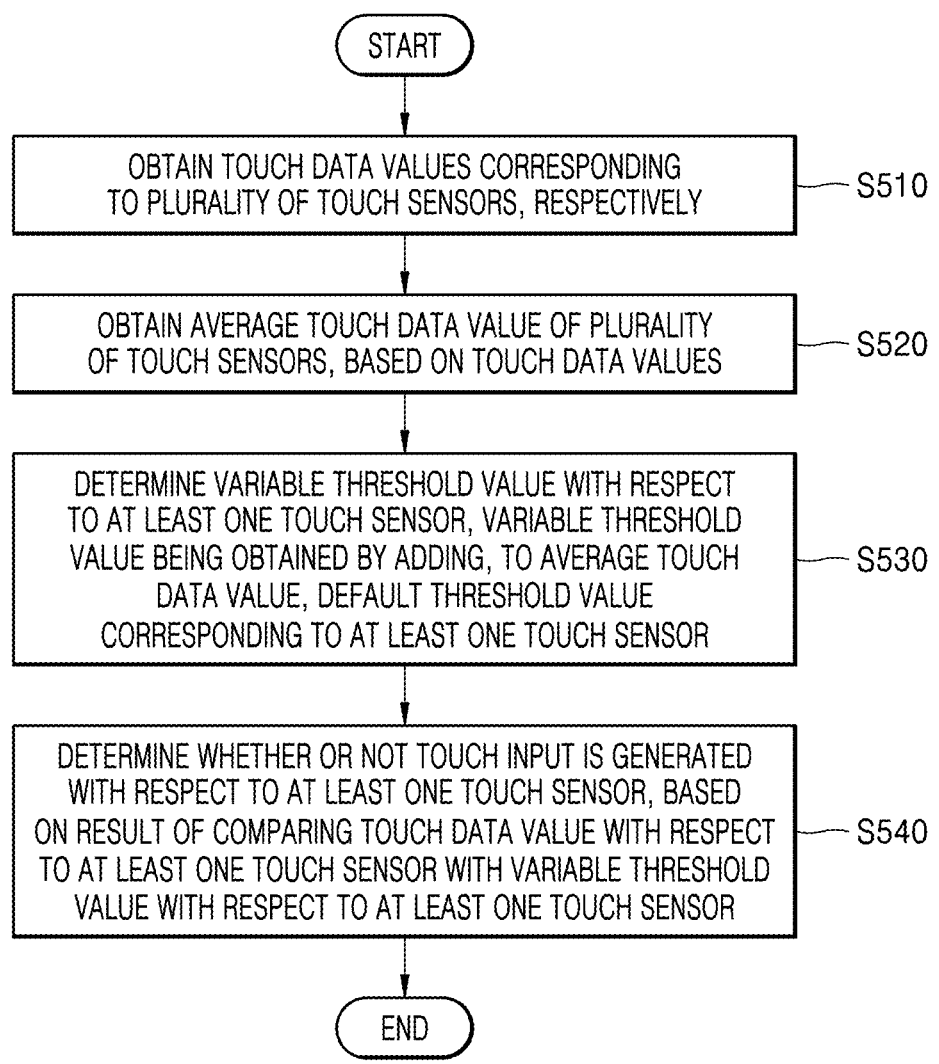
FIG. 5 is a flowchart of an embodiment of a method, performed by a wireless power transmission apparatus, of determining whether or not a touch input is generated, according to the disclosure.

FIG. 5 is a flowchart of an embodiment of a method, performed by the wireless power transmission apparatus 1000, of determining whether or not a touch input is generated, according to the disclosure.

In operation S510, the processor 1200 of the wireless power transmission apparatus 1000 in an embodiment of the disclosure may obtain a plurality of touch data values corresponding to the plurality of touch sensors 100, respectively.

In an embodiment of the disclosure, the processor 1200 may obtain the touch data values of the plurality of touch sensors 100 from the controller 200. In an embodiment, the touch controller 200 may receive a capacitance of each of the plurality of touch sensors 100 and calculate the capacitance into touch data, for example. The touch controller 200 may transmit, to the processor 1200, the touch data values corresponding to the plurality of touch sensors 100, respectively.

The capacitances of the plurality of touch sensors 100 may increase due to a touch by a user or wet steam, and the processor 1200 may obtain increased touch data values. In an embodiment, when there is a user's touch on at least one of the plurality of touch sensors 100, a capacitance of the at least one of the plurality of touch sensors 100 may increase, and the processor 1200 may obtain an increased touch data value, for example. In an embodiment, when wet steam falls down on the plurality of touch sensors 100, a capacitance of at least one of the plurality of touch sensors 100 may increase, and the processor 1200 may obtain an increased touch data value, for example.

Generally, wet steam slowly falls down on a wide area and tends to accumulate on the area on which it has fallen down. In an embodiment of the disclosure, when wet steam falls down on the touch panel 1530, a capacitance of each of the plurality of touch sensors 100 may increase, and a touch data value of each of the plurality of touch sensors 100 may be increased.

In an embodiment of the disclosure, even when there is no user's input on the plurality of touch sensors 100, the touch data value of each of the plurality of touch sensors 100 may be increased due to the wet steam.

In operation S520, the processor 1200 in an embodiment of the disclosure may obtain an average touch data value of the plurality of touch sensors 100 based on the touch data values.

In an embodiment of the disclosure, the processor 1200 may obtain the average touch data value, which is an average of the touch data values of the plurality of touch sensors 100 obtained in operation S510.

The average touch data value may be an average of the touch data values, which are scanned with respect to all of the touch sensors 100 connected to one touch controller 200. The average touch data value may be a predetermined constant value with respect to all of the touch sensors 100. In an embodiment, when the touch panel 1530 includes one touch controller 200, and the touch controller 200 is connected to each of the plurality of touch sensors 100, the processor 1200 may obtain an average touch data value of the touch data values of the plurality of touch sensors 100, for example.

In an embodiment of the disclosure, when wet steam falls down on the touch panel 1530, the average touch data value of the plurality of touch sensors 100 may be increased.

When the touch panel 1530 includes two touch controllers 200, and the touch sensors are divided into two groups and the touch sensors in each group are connected to the different touch controller 200, the processor 1200 may obtain each of a first average touch data value of the touch sensors included in a first group and a second average touch data value of the touch sensors included in a second group. This feature will be described in detail with reference to FIG. 17.

In operation S530, the processor 1200 in an embodiment of the disclosure may determine a variable threshold value with respect to at least one touch sensor from among the plurality of touch sensors 100, the variable threshold value being obtained by adding, to the average touch data value, a default threshold value corresponding to the at least one touch sensor.

In an embodiment of the disclosure, the processor 1200 may identify a default threshold value corresponding to each of the plurality of touch sensors 100. The processor 1200 may identify, from the memory 1600 of the wireless power transmission apparatus 1000, the default threshold value of each of the plurality of touch sensors 100, which is stored in the memory 1600.

In an embodiment of the disclosure, the default threshold value may be a value designed appropriately for the characteristics of the plurality of touch sensors 100 included in the wireless power transmission apparatus 1000 and may be a fixed default value. The default threshold value may be an element that has to be taken into account to determine that a user's touch input with respect to the plurality of touch sensors 100 is normal. The default threshold value may be different for each touch sensor.

In an embodiment of the disclosure, the variable threshold value may be defined as a value obtained by adding, to the default threshold value of each of the plurality of touch sensors 100, the average touch data value. The variable threshold value may be changed by reflecting an increase in the touch data value of the plurality of touch sensors 100 in an environment in which there is an abnormal touch input. The variable threshold value may be different for each touch sensor. In an embodiment, the abnormal touch input may occur when wet steam falls down on the touch panel 1530, for example.

The processor 1200 may determine the variable threshold value of each touch sensor 100 by adding, to the average touch data value, the default threshold value of each touch sensor 100. The variable threshold value of each touch sensor may be greater than the default threshold value of each touch sensor.

In operation S540, the processor 1200 in an embodiment of the disclosure may determine whether or not a touch input is generated with respect to at least one touch sensor, based on a result of comparing the touch data value with respect to the at least one touch sensor with the variable threshold value with respect to the at least one touch sensor.

The processor 1200 may compare the touch data value of each touch sensor, obtained in operation S510, with the variable threshold value of each touch sensor, determined in operation S530. The processor 1200 may determine whether or not a user's touch input is generated with respect to each touch sensor, based on a result of the comparing.

In an embodiment, when the touch data value with respect to a touch sensor exceeds the variable threshold value with respect to the touch sensor, the processor 1200 may determine that a touch input with respect to the corresponding touch sensor is normal and may perform an operation corresponding to the touch input, for example.

In an embodiment, when the touch data value with respect to a touch sensor is equal to or less than the variable threshold value with respect to the touch sensor, the processor 1200 may determine that a touch input with respect to the corresponding touch sensor is abnormal and may ignore the touch input, for example. In an embodiment, the processor 1200 may determine the touch data value with respect to the corresponding touch sensor as a noise signal and may ignore the touch input with respect to the corresponding touch sensor, for example, but is not limited thereto.

In an embodiment of the disclosure, the wireless power transmission apparatus 1000 may determine whether or not a user's touch input is generated, based on the variable threshold value taking into account the average touch data value, even when the touch data values of the plurality of touch sensors 100 are increased regardless of a user's intention. In an embodiment, when wet steam reaches down on the touch panel 1530, not only the touch data value of the touch sensor, but also the variable threshold value of the touch sensor may be increased, for example. Here, the wireless power transmission apparatus 1000 may determine whether or not a user's touch input is generated, based on the variable threshold value that is greater than the default threshold value, and thus, may minimize the malfunction of the touch panel 1530 due to the wet steam. Hereinafter, an operation of the wireless power transmission apparatus 1000 for determining whether or not a user's touch input is generated, by comparing the touch data value obtained from the touch sensor with the variable threshold value, will be described in more detail with reference to FIG. 6.

Figure 6:
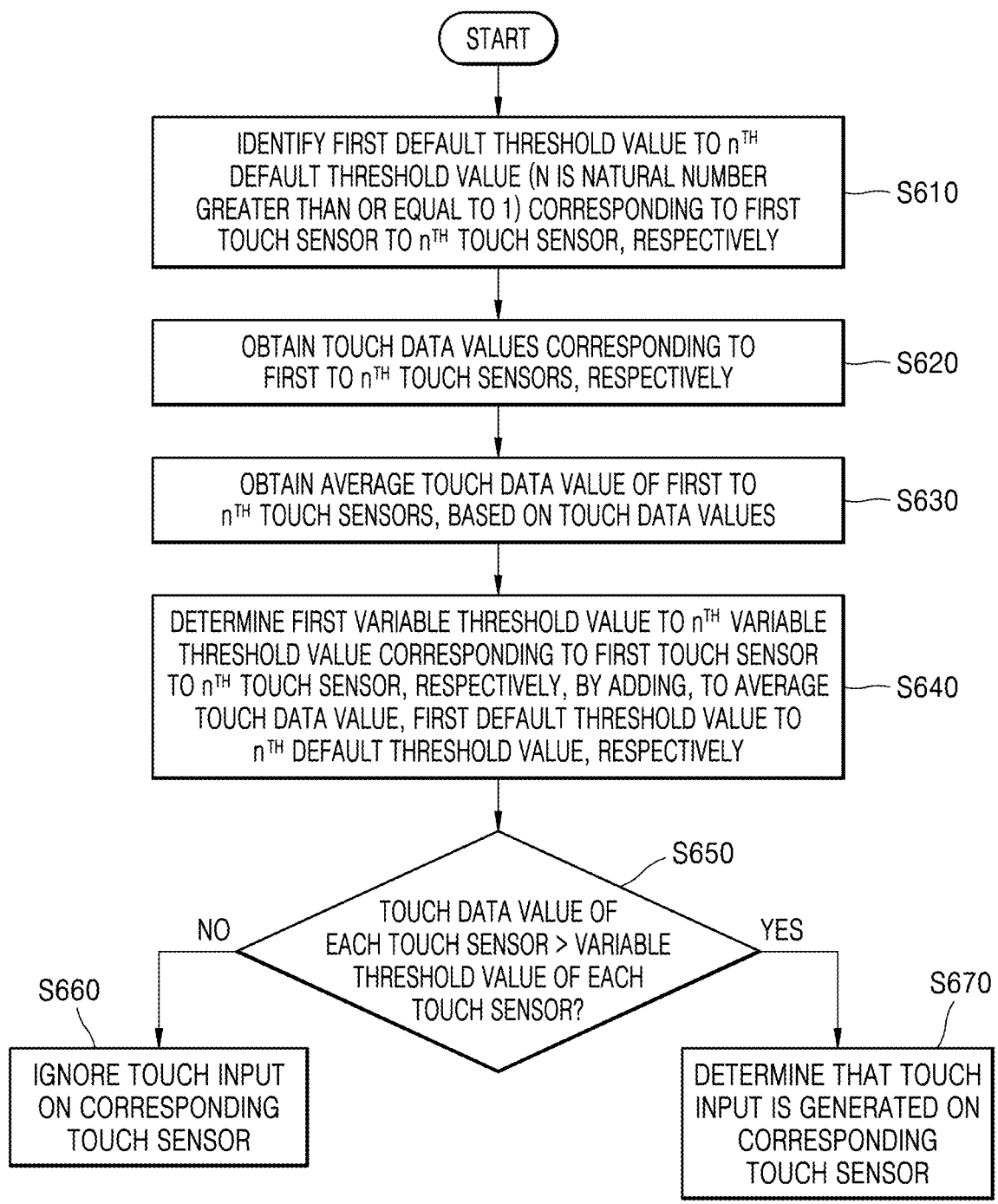
FIG. 6 is a flowchart of an embodiment of a method, performed by a wireless power transmission apparatus, of determining whether or not a touch input is generated, according to the disclosure.

FIG. 6 is a flowchart of an embodiment of a method, performed by the wireless power transmission apparatus 1000, of determining whether or not a touch input is generated, according to the disclosure.

In FIG. 6, the same descriptions as FIG. 5 are omitted, and a detailed method of determining whether or not a touch input is generated, by comparing a touch data value of each of the plurality of touch sensors 100 with a variable threshold value, will be described.

Hereinafter, the wireless power transmission apparatus 1000 is illustrated as including a first touch sensor to an $n^{th}$ touch sensor, that is, n touch sensors (n is a natural number equal to or greater than 2). In an embodiment, as illustrated in FIG. 3, the wireless power transmission apparatus 1000 may include the first to twenty-fifth touch sensors, that is, 25 touch sensors, for example.

In operation S610, the processor 1200 may identify a first default threshold value to an $n^{th}$ default threshold value corresponding to the first touch sensor to the $n^{th}$ touch sensor, respectively. The first touch sensor may have the first default threshold value, and the $n^{th}$ touch sensor may have the $n^{th}$ default threshold value. The first default threshold value and the $n^{th}$ default threshold value may be different from each other or the same as each other.

The processor 1200 may identify, from the memory 1600, the first to $n^{th}$ default threshold values respectively corresponding to the first to $n^{th}$ touch sensors, which are stored in the memory 1600.

In operation S620, the processor 1200 may obtain touch data values corresponding to the first to $n^{th}$ touch sensors, respectively. The processor 1200 may obtain a first touch data value from the first touch sensor and an $n^{th}$ touch data value from the $n^{th}$ touch sensor. The processor 1200 may sequentially scan the first to $n^{th}$ touch sensors and obtain the first to $n^{th}$ touch data values according to a change in capacitance of each touch sensor.

In an embodiment, when there is a touch by a user on the $n^{th}$ touch sensor, the $n^{th}$ touch data value may be increased (refer to 1530-1 of FIG. 7), for example. In an embodiment, when there is no touch by a user on the $n^{th}$ touch sensor, but there is wet steam, the $n^{th}$ touch data value may be increased (refer to 1530-2 of FIG. 11), for example. In an embodiment, when there are both a touch by a user and wet steam on the $n^{th}$ touch sensor, the $n^{th}$ touch data value may be increased (refer to 1530-3 of FIG. 14), for example.

In operation S630, the processor 1200 may obtain an average touch data value of the first touch sensor to the $n^{th}$ touch sensor, based on the touch data values. In an embodiment, the average touch data value may be an arithmetic average value obtained by summing the first to $n^{th}$ touch data values and then dividing the summed first to $n^{th}$ touch data values by n, for example. In an embodiment, the average touch data value may be a geometric average value or a harmonic average value, for example. In an embodiment, the average touch data value may be a median value or a mode value of the first to $n^{th}$ touch data values, for example.

In operation S640, the processor 1200 may determine first to $n^{th}$ variable threshold values corresponding to the first to $n^{th}$ touch sensors, respectively, by adding, to the average touch data value, the first to $n^{th}$ default threshold values, respectively.

In an embodiment, the $n^{th}$ variable threshold value may be obtained by adding, to the $n^{th}$ default threshold value with respect to the $n^{th}$ touch sensor, the average touch data value, for example. The $n^{th}$ variable threshold value may be a reference value for determining whether or not a touch input is generated with respect to the $n^{th}$ touch sensor.

In operation S650, the processor 1200 may compare the touch data value of each touch sensor with the variable threshold value of each touch sensor.

In an embodiment, the processor 1200 may compare the $n^{th}$ touch data value of the $n^{th}$ touch sensor with the $n^{th}$ variable threshold value of the $n^{th}$ touch sensor, for example.

In operation S660, when the touch data value of each touch sensor is equal to or less than the variable threshold value of each touch sensor, the processor 1200 may determine that a touch input on the corresponding touch sensor is abnormal and may ignore the touch input.

In an embodiment, when the $n^{th}$ touch data value with respect to the $n^{th}$ touch sensor is equal to or less than the $n^{th}$ variable threshold value, the processor 1200 may determine that a touch input with respect to the $n^{th}$ touch sensor is abnormal and may ignore the touch input with respect to the $n^{th}$ touch sensor, for example. In an embodiment, when the $n^{th}$ touch data value of the $n^{th}$ touch sensor is equal to or less than the $n^{th}$ variable threshold value taking into account the average touch data value, even though the $n^{th}$ touch data value of the $n^{th}$ touch sensor is increased by the wet steam, the processor 1200 may determine that a touch input on the $n^{th}$ touch sensor is abnormal and may ignore the touch input, for example. This feature will be described in detail with reference to 1530-2 of FIG. 13.

In operations S650 and S670, when the touch data value of each touch sensor is greater than the variable threshold value of each touch sensor, the processor 1200 may determine that a touch input is generated on a corresponding touch sensor. The processor 1200 may perform an operation corresponding to the touch input on the corresponding touch sensor.

In an embodiment, when the $n^{th}$ touch data value of the $n^{th}$ touch sensor is greater than the $n^{th}$ variable threshold value of the $n^{th}$ touch sensor, the processor 1200 may determine that a touch input is generated on the $n^{th}$ touch sensor, for example. The processor 1200 may perform an operation corresponding to the touch input on the $n^{th}$ touch sensor. The operation corresponding to the touch input on the $n^{th}$ touch sensor may include, e.g., adjustment of a power level, cooking time reservation, suspension of power transmission of the wireless power transmission apparatus 1000, etc.

The processor 1200 may scan the touch data values of the plurality of touch sensors 100 based on a predetermined cycle. The processor 1200 may scan the touch data values of the touch sensors during a first cycle, and then, may scan the touch data values of the touch sensors during a second cycle, which is next to the first cycle.

In an embodiment of the disclosure, the wireless power transmission apparatus 1000 may flexibly change the threshold values, which are criteria for touch inputs, by taking into account average touch data, which is increased by wet steam. That is, even when the touch data values of the touch sensors are increased by the wet steam during an operation of the wireless power transmission apparatus 1000 in an embodiment according to the disclosure, the wireless power transmission apparatus 1000 may determine whether or not a touch input is generated based on the variable threshold values, and thus, the wireless power transmission apparatus 1000 may minimize a malfunction of the touch panel 1530 due to the wet steam.

Hereinafter, a process in which the wireless power transmission apparatus 1000 calculates touch data values of touch sensors and determines whether or not a touch input is generated, will be described in detail with reference to a graph by referring to FIGS. 7 through 15. For convenience of explanation, it is illustrated that the touch panel 1530 of the wireless power transmission apparatus 1000 includes 10 touch sensors. In an embodiment, the plurality of touch sensors 100 may include a first touch sensor 101, a second touch sensor 102, a third touch sensor 103, a fourth touch sensor 104, a fifth touch sensor 105, a sixth touch sensor 106, a seventh touch sensor 107, an eighth touch sensor 108, a ninth touch sensor 109, and a tenth touch sensor 110, for example.

Figure 7:
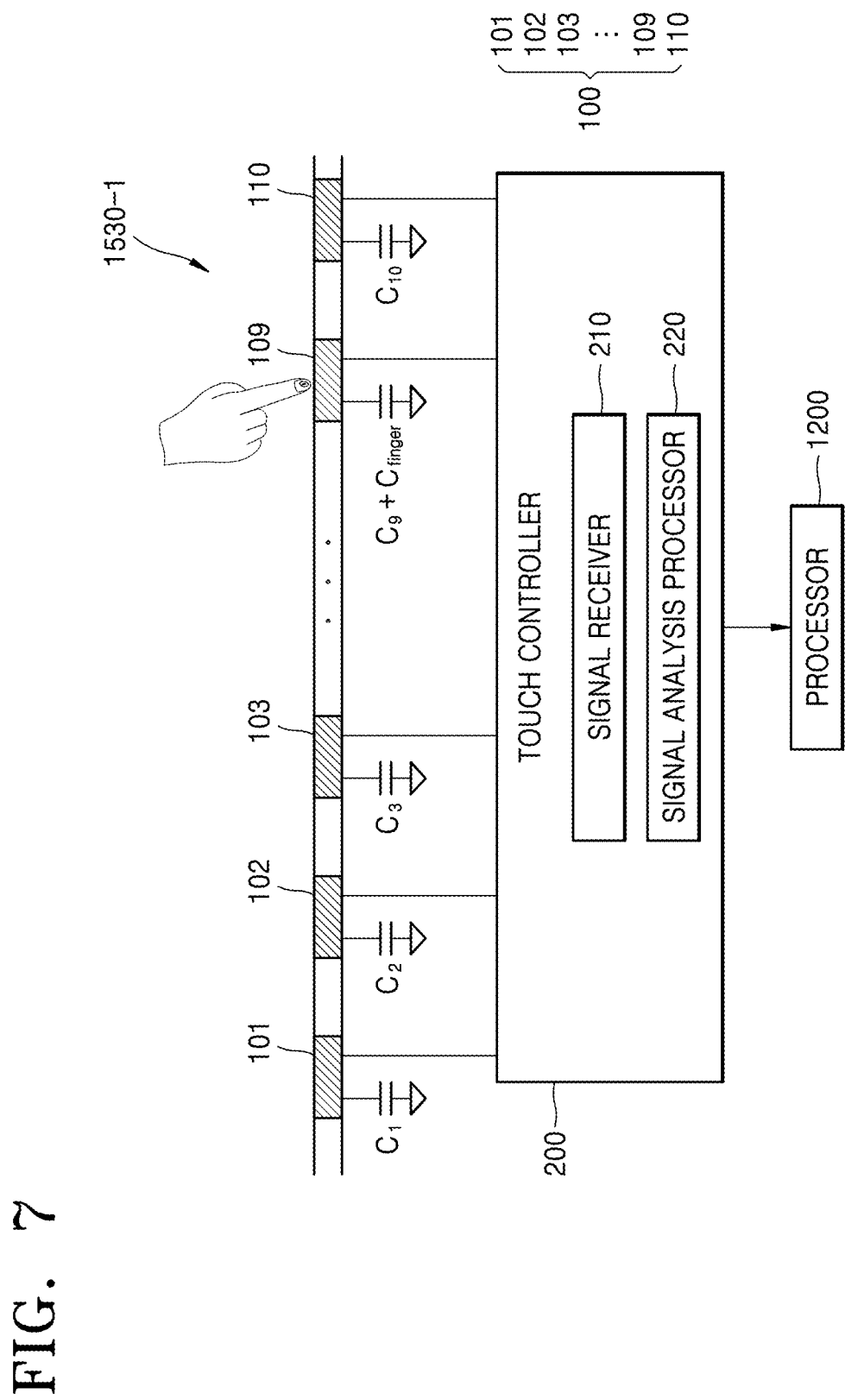
FIG. 7 is a conceptual diagram illustrating an embodiment of a situation in which there is a user's touch on touch sensors in a wireless power transmission apparatus according to the disclosure.
Figure 8:
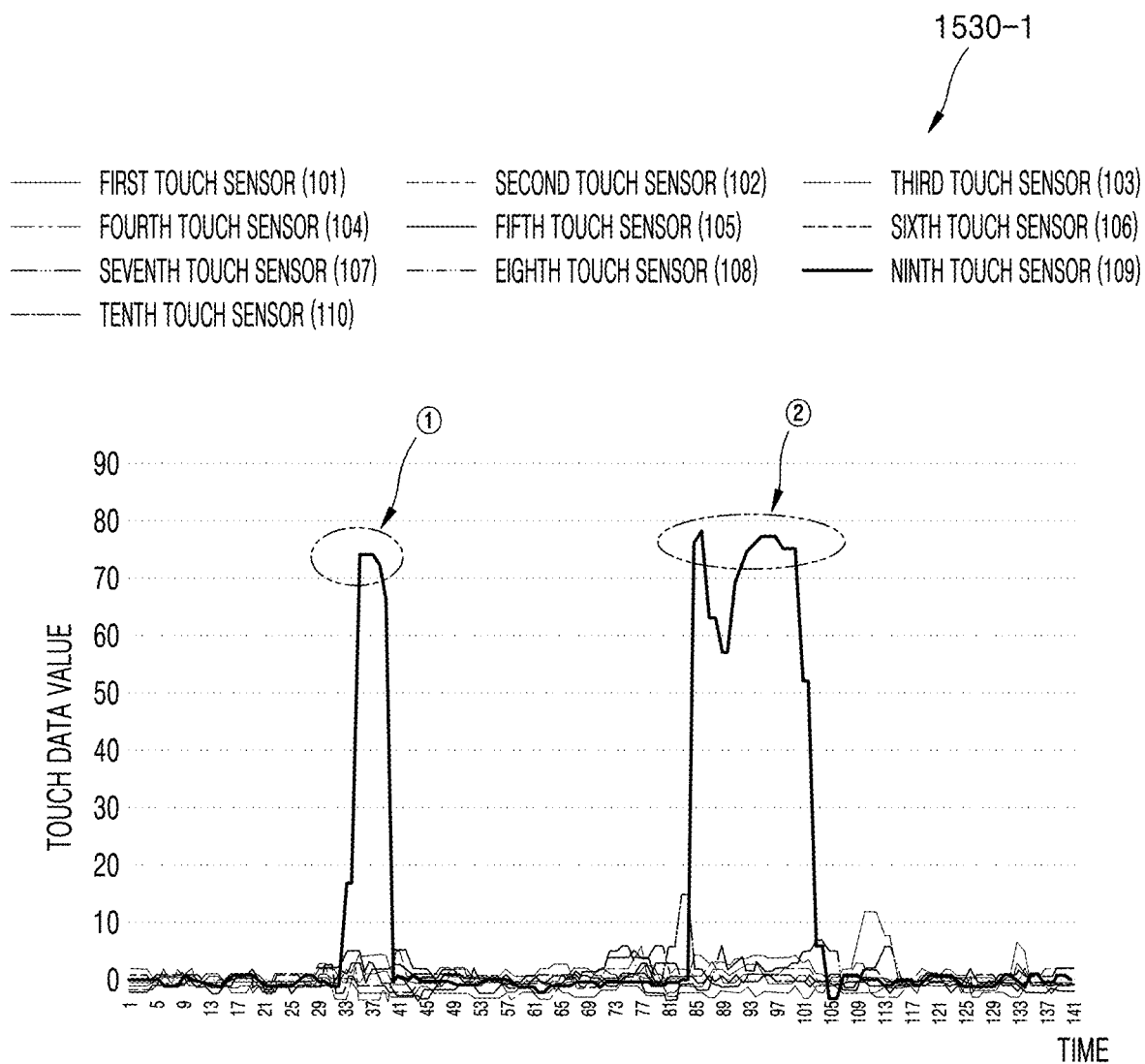
FIG. 8 is an example graph of touch data values of the plurality of touch sensors according to FIG. 7.
Figure 9A:
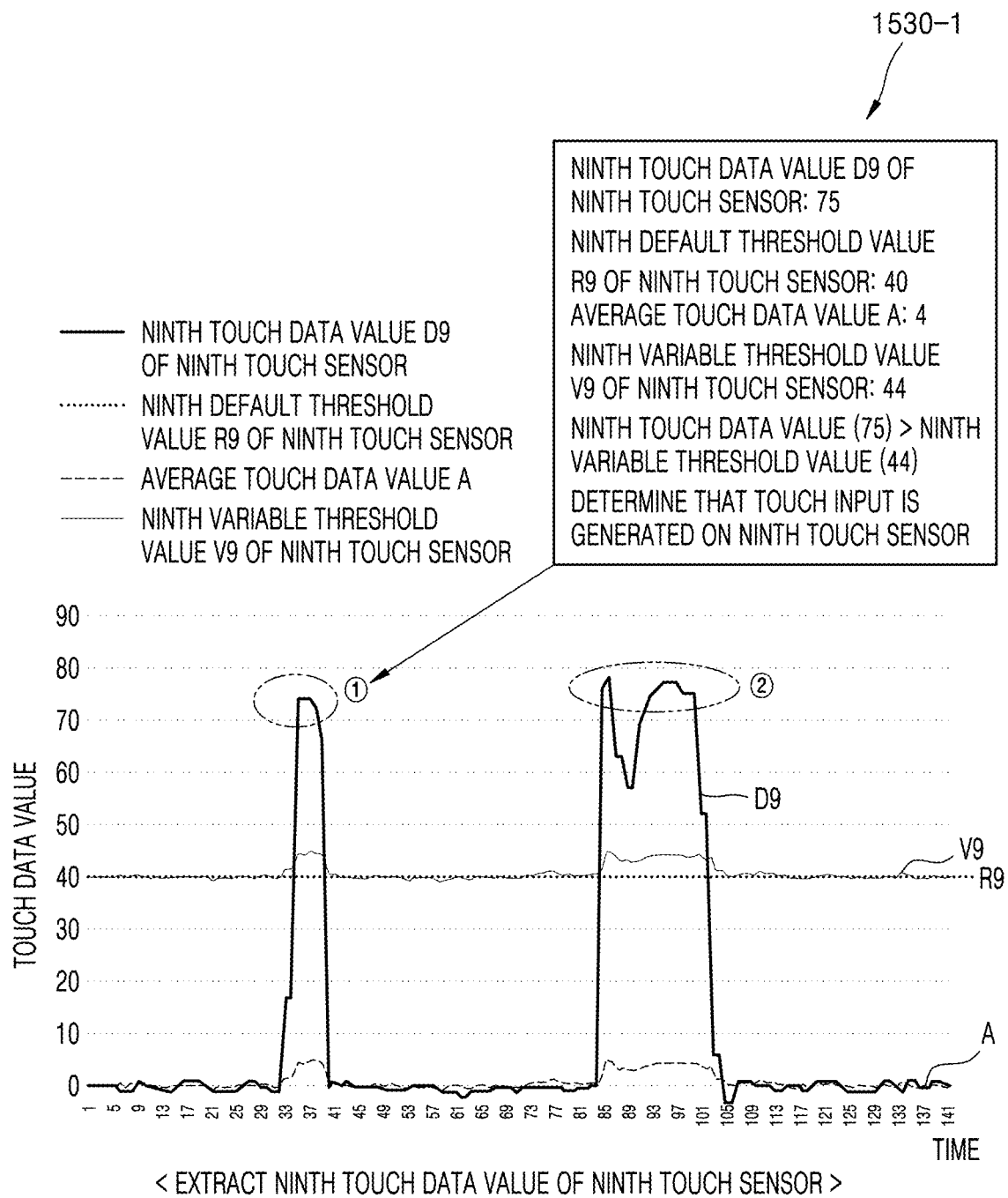
FIG. 9A is an example graph of an extracted touch data value of any one touch sensor from among the plurality of touch sensors according to FIG. 8.
Figure 9B:
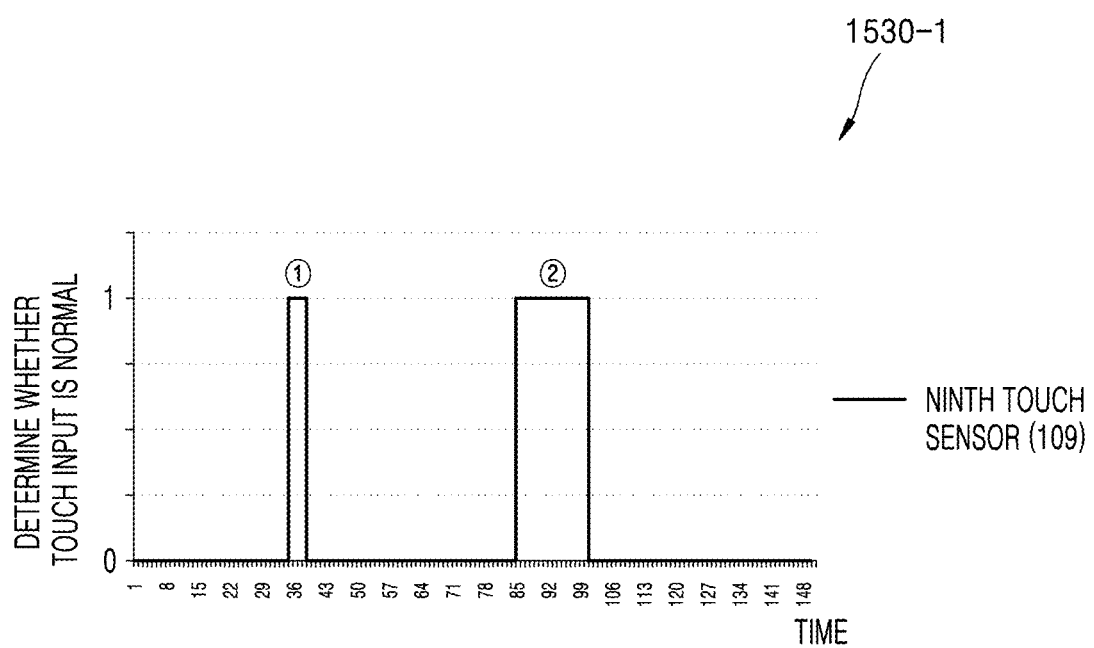
FIG. 9B is an example graph indicating whether or not a touch input is generated, according to the touch data value of any one touch sensor from among the plurality of touch sensors according to FIG. 8.

FIG. 7 is a conceptual diagram of an embodiment of a situation in which there is a user's touch on a touch sensor of the wireless power transmission apparatus 1000 according to the disclosure. FIG. 8 is an example graph of touch data values of the plurality of touch sensors 100 according to FIG. 7. FIG. 9A is an example graph of an extracted touch data value of any one touch sensor from among the plurality of touch sensors 100 according to FIG. 8. FIG. 9B is an example graph indicating whether or not a touch input is generated, according to a touch data value of any one touch sensor from among the plurality of touch sensors 100 according to FIG. 8.

FIGS. 7A through 9B illustrate an embodiment of a case in which a normal touch by a user is generated on the ninth touch sensor 109 of the touch panel 1530-1 according to the disclosure.

In FIG. 7, each of the plurality of touch sensors 100 included in the touch panel 1530-1 may have an intrinsic parasitic capacitance Cn. In an embodiment, the first touch sensor 101 may have a parasitic capacitance C1, the second touch sensor 102 may have a parasitic capacitance C2, the third touch sensor 103 may have a parasitic capacitance C3, the ninth touch sensor 109 may have a parasitic capacitance C9, and the tenth touch sensor 110 may have a parasitic capacitance C10, for example.

In an embodiment of the disclosure, when there is a touch by the user on the ninth touch sensor 109, a capacitance by a part of a human body of the user (e.g., a finger) (hereinafter, also referred to as a "finger capacitance") Cfinger may be parallelly added to the parasitic capacitance C9 of the ninth touch sensor 109. Accordingly, a capacitance of the ninth touch sensor 109 may become C9+Cfinger, which is a sum of the intrinsic parasitic capacitance C9 and the finger capacitance Cfinger.

In an embodiment of the disclosure, a change of capacitance in each of the plurality of touch sensors 100 may be transmitted to the signal receiver 210 of the touch controller 200. The signal analysis processor 220 may measure a charging time according to the change of capacitance in each of the plurality of touch sensors 100 and may calculate the touch data value of each of the plurality of touch sensors 100 by converting the charging time into a frequency signal. In an embodiment, the touch data value of each of the plurality of touch sensors 100 may be measured as illustrated in FIG. 8, for example.

In more detail, when there is a user's touch on the ninth touch sensor 109, the capacitance of the ninth touch sensor 109 may be drastically increased. In general, a resistance-capacitance (RC) delay is proportional to a capacitance, and thus, when the capacitance increases, the RC delay may increase. The signal analysis processor 220 of the touch controller 200 may measure a charging time (that is, the RC delay) increasing according to the change of capacitance, and may convert the measured charging time into a frequency signal to calculate the touch data value of the ninth touch sensor 109. Because there is a user's touch on the ninth touch sensor 109, a ninth touch data value of the ninth touch sensor 109 may be increased.

In an embodiment, when there is a user's touch on the ninth touch sensor 109, a capacitance of the ninth touch sensor 109 may be increased (C9+Cfinger), for example. The RC delay corresponding to the finger capacitance Cfinger may occur, and the signal analysis processor 220 may measure the increased RC delay and may calculate the ninth touch data value of the ninth touch sensor 109. The ninth touch data value of the ninth touch sensor 109 may be greater than the touch data values of the remaining touch sensors on which there is no user's touch (e.g., a first touch data value of the first touch sensor 101, etc.).

FIG. 8 illustrates the first touch data value of the first touch sensor 101 to a tenth touch data value of the tenth touch sensor 110, obtained by the processor 1200. An X axis indicates a time, and a Y axis indicates touch data values.

In an embodiment, when there is a normal user's touch on the ninth touch sensor 109, the ninth touch data value of the ninth touch sensor 109 may be increased at point ① (a time between 35 and 39) and point ② (a time between 85 and 101), for example.

FIG. 9A illustrate the ninth touch data value D9 of the ninth touch sensor 109, a ninth default threshold value R9 of the ninth touch sensor 109, an average touch data value A of all of the touch sensors 100, and a ninth variable threshold value V9 of the ninth touch sensor 109 at point ① (a time between 35 and 39). An X axis indicates a time, and a Y axis indicates touch data values.

Referring to FIG. 9B, a graph indicates a determining operation of the processor 1200 with respect to whether or not a touch input is generated on the ninth touch sensor 109. An X axis indicates a time, and a Y axis indicates a value of determining whether or not a touch input is generated. In an embodiment, when the processor 1200 determines that a touch input is normal, the processor 1200 may indicate the value of the determining as 1, and when the processor 1200 determines that a touch input is abnormal, the processor 1200 may indicate the value of the determining as 0, for example.

In an embodiment, in FIGS. 9A and 9B, with respect to the determining of whether or not the touch input is generated at point ① (the time between 35 and 39), the ninth touch data value D9 of the ninth touch sensor 109 may be 75, and the ninth default threshold value R9 of the ninth touch sensor 109 may be 40. The average touch data value A of the plurality of touch sensors 100 at point ① may be 4, for example. The ninth variable threshold value V9 of the ninth touch sensor 109 at point ①, obtained by adding the average touch data value A to the ninth default threshold value R9, may be 44. Considering that the average touch data value A at point ① is 4, it may be understood that little wet steam is introduced to the plurality of touch sensors 100 at point ①.

The processor 1200 may compare the ninth touch data value D9 of the ninth touch sensor 109 with the ninth variable threshold value V9 of the ninth touch sensor 109. Because the ninth touch data value D9 is greater than the ninth variable threshold value V9, the processor 1200 may determine that a user's touch input is generated on the ninth touch sensor 109 at point ① (the time between 35 and 39). The processor 1200 may perform an operation corresponding to the touch input on the ninth touch sensor 109. In an embodiment, the ninth touch sensor 109 is connected or mapped with a touch button for setting a maximum power level of a cooker of a fourth quadrant, the processor 1200 may control the inverter circuit to transmit, to the cooker of the fourth quadrant, power according to the maximum power level, for example.

The processor 1200 may also determine that a touch input is generated on the ninth touch sensor 109 at point ② (the time between 85 and 101).

In an embodiment, by the same process as determining whether or not a touch input is generated at point ① (the time between 35 and 39), the processor 1200 may determine that a user's touch input is generated on the ninth touch sensor 109 at point ② (the time between 85 and 101), for example.

Figure 10A:
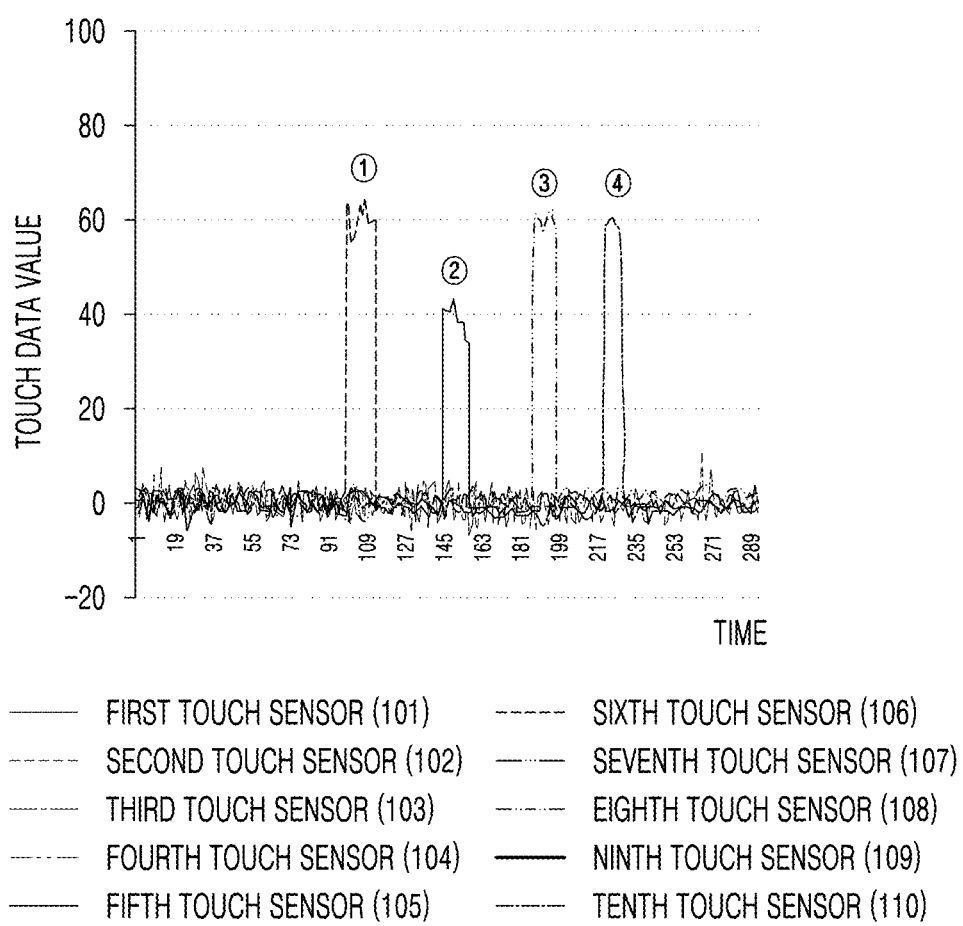
FIG. 10A is an example graph indicating an embodiment of touch data values of a plurality of touch sensors in a wireless power transmission apparatus according to the disclosure.
Figure 10B:
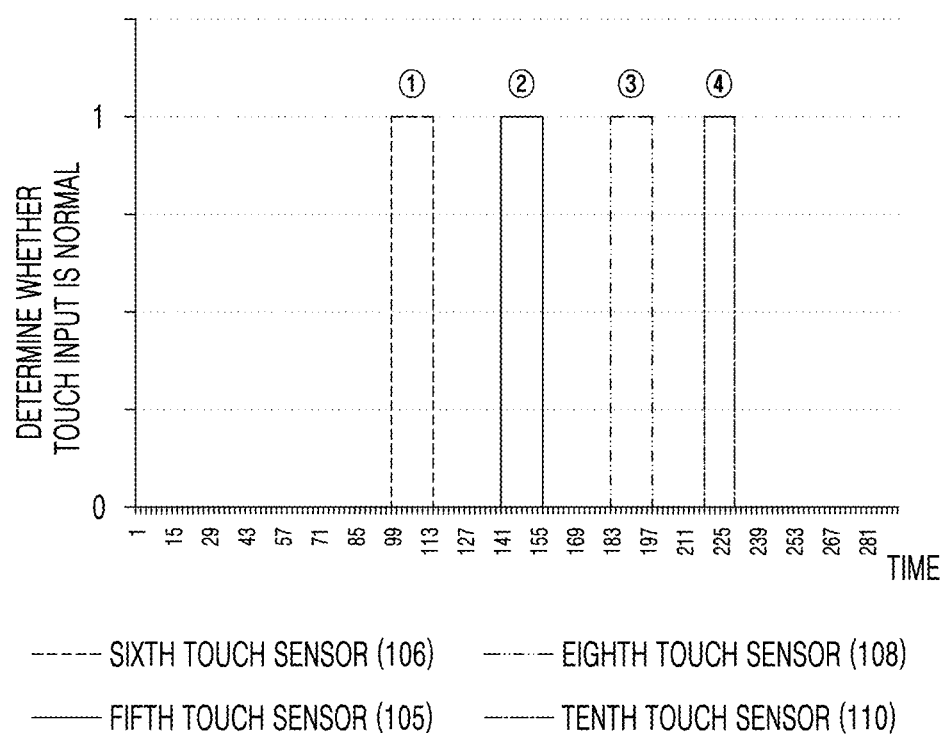
FIG. 10B is an example graph indicating whether or not a touch input is generated, according to the touch data values of the plurality of touch sensors according to FIG. 10A.

FIG. 10A is an example graph indicating touch data values of the plurality of touch sensors 100 in the wireless power transmission apparatus 1000 in an embodiment according to the disclosure. FIG. 10B is an example graph indicating whether or not a touch input is generated, according to the touch data values of the plurality of touch sensors 100 according to FIG. 10A.

FIG. 10A illustrates a first touch data value of the first touch sensor 101 to a tenth touch data value of the tenth touch sensor 110, obtained by the processor 1200. An X axis indicates a time, and a Y axis indicates touch data values.

Referring to FIG. 10B, a graph indicates a determining operation of the processor 1200 with respect to whether or not a touch input is generated on each of the plurality of touch sensors 100. An X axis indicates a time, and a Y axis indicates a value of determining whether or not a touch input is generated. In an embodiment, when the processor 1200 determines that a touch input is normal, the processor 1200 may indicate the value of the determining as 1, and when the processor 1200 determines that a touch input is abnormal, the processor 1200 may indicate the value of the determining as 0, for example.

In an embodiment of the disclosure, the processor 1200 may obtain the touch data values of the plurality of touch sensors 100 and may determine whether or not a touch input is generated on each of the plurality of touch sensors 100 for each predetermined time.

In an embodiment, a sixth touch data value of the sixth touch sensor 106 may exceed a sixth variable threshold value (not shown) at point ① (a time between 99 and 113), for example. The processor 1200 may compare the sixth touch data value with the sixth variable threshold value and may determine that a user's touch input is generated on the sixth touch sensor 106 at point ①.

In an embodiment, a fifth touch data value of the fifth touch sensor 105 may exceed a fifth variable threshold value (not shown) at point ② (a time between 141 and 155). The processor 1200 may compare the fifth touch data value with the fifth variable threshold value and may determine that a user's touch input is generated on the fifth touch sensor 105 at point ②, for example.

In an embodiment, an eighth touch data value of the eighth touch sensor 108 may exceed an eighth variable threshold value (not shown) at point ③ (a time between 183 and 197). The processor 1200 may compare the eighth touch data value with the eighth variable threshold value and may determine that a user's touch input is generated on the eighth touch sensor 108 at point ③, for example.

In an embodiment, the tenth touch data value of the tenth touch sensor 110 may exceed a tenth variable threshold value (not shown) at point ④ (a time between 220 and 235). The processor 1200 may compare the tenth touch data value with the tenth variable threshold value and may determine that a user's touch input is generated on the tenth touch sensor 110 at point ④), for example.

The processor 1200 may determine that a touch input is generated on the sixth touch sensor 106 at point ① (the time between 99 and 113), a touch input is generated on the fifth touch sensor 105 at point ② (the time between 141 and 155), a touch input is generated on the eighth touch sensor 108 at point ③ (the time between 183 and 197), and a touch input is generated on the tenth touch sensor 110 at point ④ (the time between 220 and 235).

Here, the processor 1200 may perform operations corresponding to touch buttons mapped with the sixth touch sensor 106, the fifth touch sensor 105, the eighth touch sensor 108, and the tenth touch sensor 110, respectively. In an embodiment, the processor 1200 may change a power level of the wireless power transmission apparatus 1000, reserve a cooking time, or suspend power transmission of the wireless power transmission apparatus 1000, for example.

Figure 11:
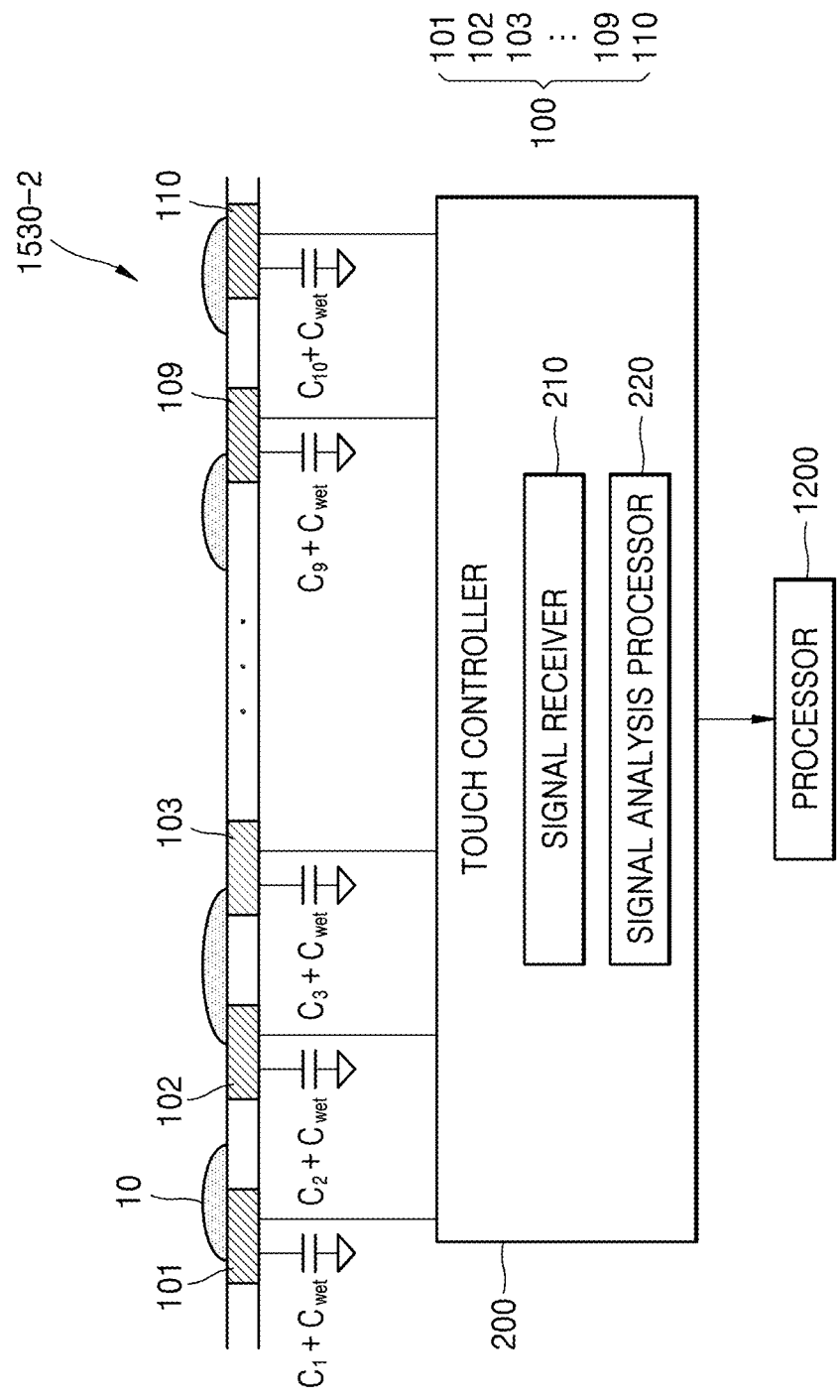
FIG. 11 is a conceptual diagram illustrating an embodiment of a situation in which wet steam falls down on a wireless power transmission apparatus according to the disclosure.
Figure 12:
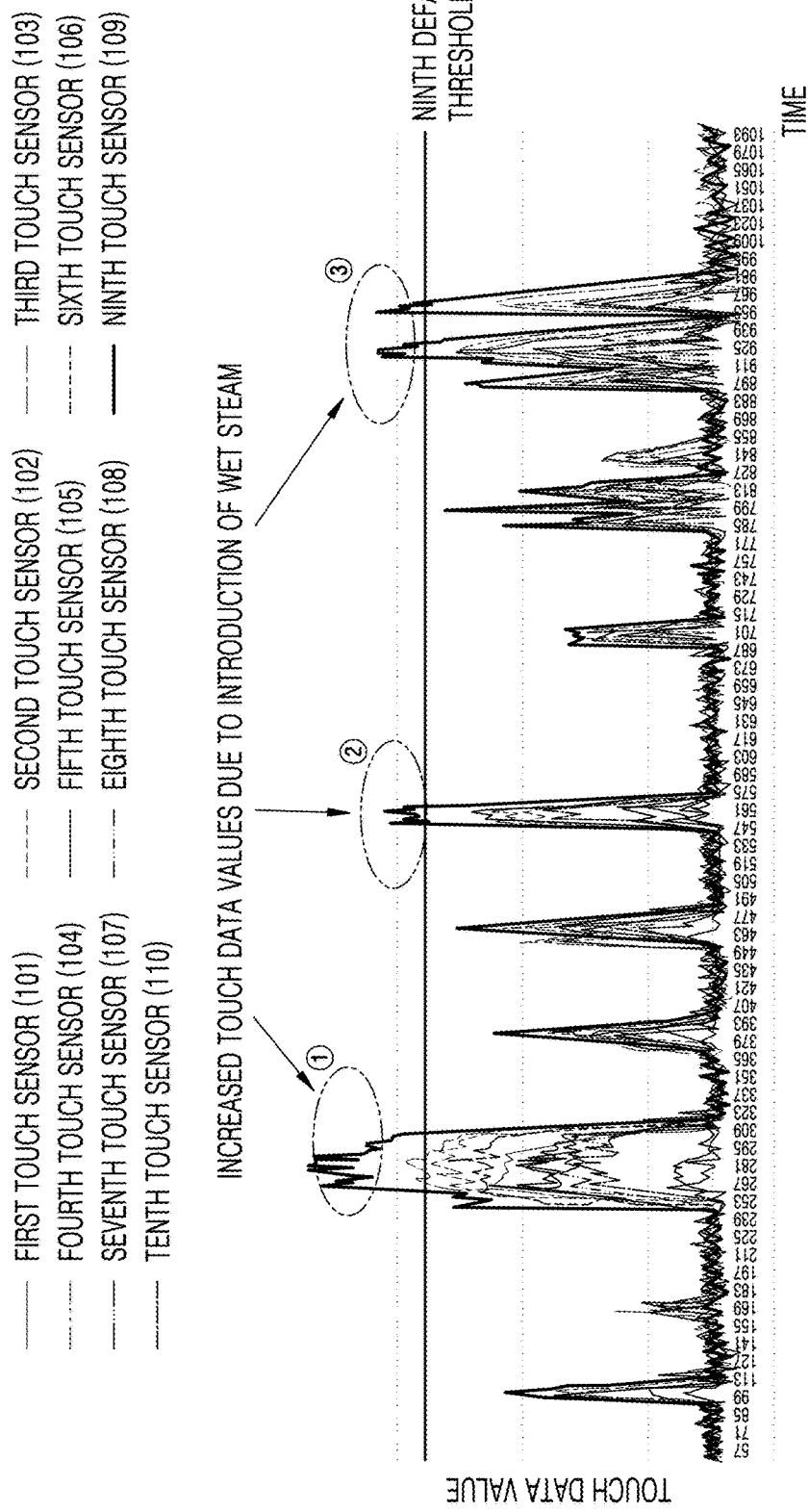
FIG. 12 is an example graph of touch data values of a plurality of touch sensors according to FIG. 11.
Figure 13A:
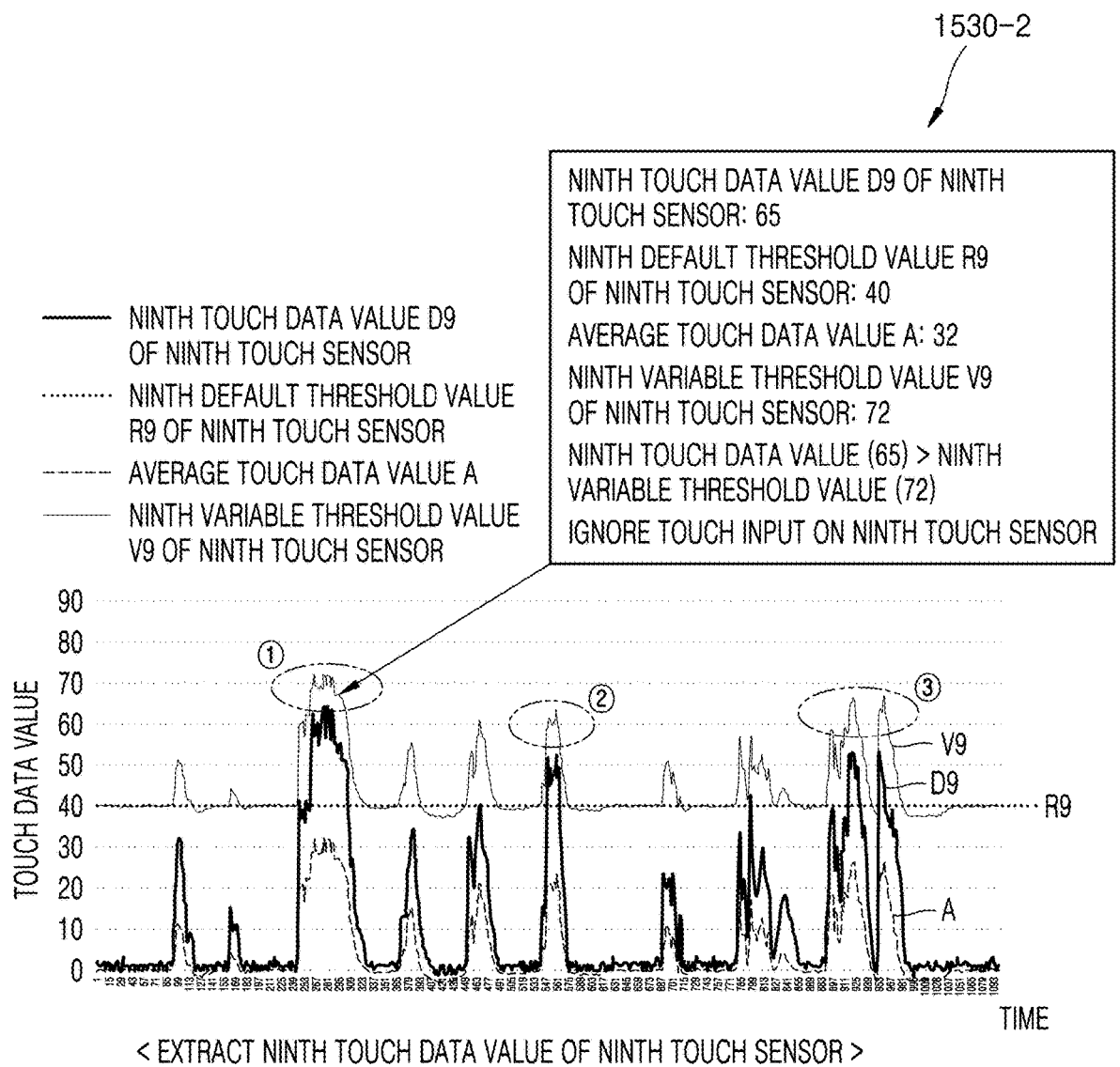
FIG. 13A is an example graph of an extracted touch data value of any one touch sensor from among the plurality of touch sensors according to FIG. 12.
Figure 13B:
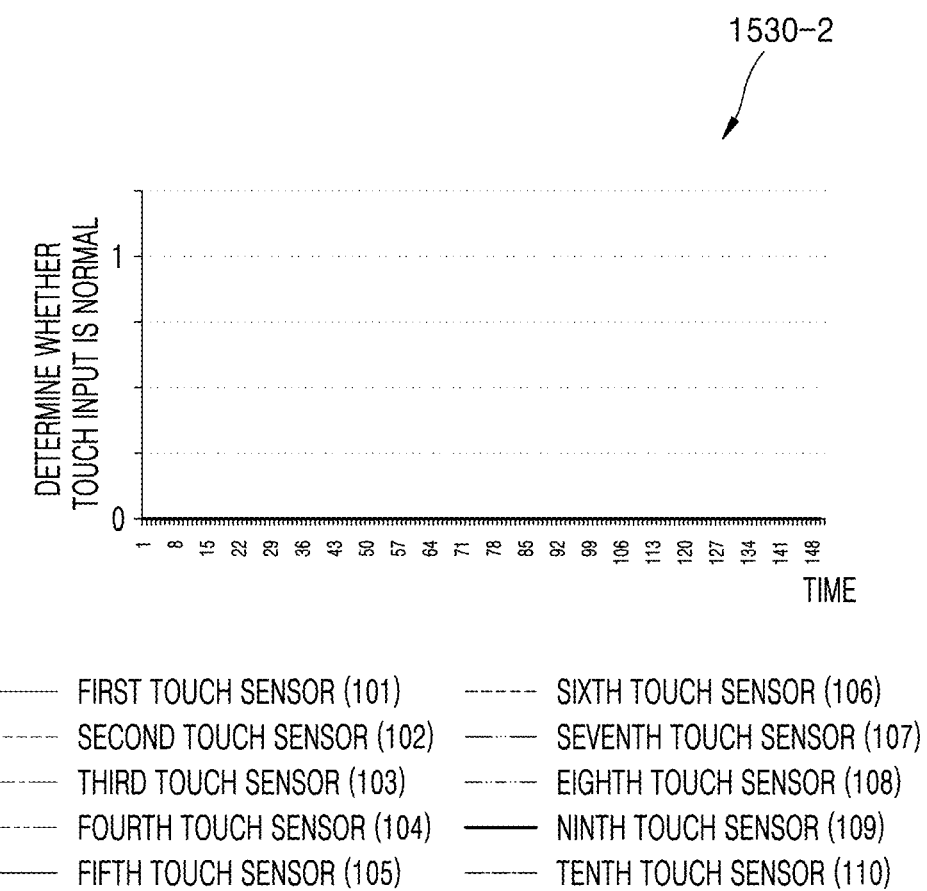
FIG. 13B is an example graph indicating whether or not a touch input is generated, according to the touch data value of any one touch sensor from among the plurality of touch sensors according to FIG. 12.

FIG. 11 is a conceptual diagram illustrating a situation in which wet steam falls down on the wireless power transmission apparatus 1000 in an embodiment according to the disclosure. FIG. 12 is an example graph of touch data values of the plurality of touch sensors 100 according to FIG. 11. FIG. 13A is an example graph of an extracted touch data value of any one touch sensor from among the plurality of touch sensors 100 according to FIG. 12. FIG. 13B is an example graph indicating whether or not a touch input is generated, according to the touch data value of any one touch sensor from among the plurality of touch sensors 100 according to FIG. 12.

FIGS. 11 through 13B illustrate a case in which there is an abnormal touch input because wet steam 10 falls down on the plurality of touch sensors 100 of the touch panel 1530-2 in an embodiment according to the disclosure. The case is where there is no user's touch on the touch panel 1530-2.

In FIG. 11, each of the plurality of touch sensors 100 included in the touch panel 1530-2 may have a parasitic capacitance Cn. The same features as the features described with reference to FIG. 7 are not repeatedly described.

In an embodiment of the disclosure, when wet steam 10 falls down on the plurality of touch sensors 100, a capacitance (hereinafter, also referred to as a "wet steam capacitance") Cwet by the wet steam 10 may be parallelly added to the parasitic capacitance Cn of each of the plurality of touch sensors 100. Accordingly, a capacitance of each of the plurality of touch sensors 100 may have a value obtained by summing the intrinsic parasitic capacitance Cn with the wet steam capacitance Cwet.

In an embodiment, when the wet steam 10 falls down on the first touch sensor 101, the wet steam capacitance Cwet may be parallelly added to the parasitic capacitance C1 of the first touch sensor 101, for example. Accordingly, the capacitance of the first touch sensor 101 may become C1+Cwet, which is a value obtained by summing the parasitic capacitance C1 with the wet steam capacitance Cwet.

Also, the capacitance of the second touch sensor 102 may become C2+Cwet, the capacitance of the third touch sensor 103 may become C3+Cwet, the capacitance of the ninth touch sensor 109 may become C9+Cwet, and the capacitance of the tenth touch sensor 110 may become C10+Cwet.

In an embodiment of the disclosure, the touch controller 200 may measure a charging time increased by the change of capacitance of each of the plurality of touch sensors 100 and may convert the measured charging time into a frequency signal to calculate a touch data value of each of the plurality of touch sensors 100. In an embodiment, the touch data value of each of the plurality of touch sensors 100 may be measured as illustrated in FIG. 12, for example.

FIG. 12 illustrates a first touch data value of the first touch sensor 101 to a tenth touch data value of the tenth touch sensor 110, obtained by the processor 1200. An X axis indicates a time, and a Y axis indicates the touch data values.

When the wet steam 10 falls down on the plurality of touch sensors 100, a touch data value of any one touch sensor from among the plurality of touch sensors 100 may be increased, and the touch data value of the touch sensor may exceed a default threshold value, but the disclosure is not limited thereto.

In an embodiment, the ninth touch data value of the ninth touch sensor 109 may be increased at point ① (a time between 253 and 323, point ② (a time between 547 and 575), and point ③ (a time between 897 and 981). The ninth touch data value of the ninth touch sensor may exceed a ninth default threshold value at point ①, point ②, and point ③, for example.

FIG. 13A illustrates the ninth touch data value D9 of the ninth touch sensor 109, the ninth default threshold value R9 of the ninth touch sensor 109, an average touch data value A of all of the touch sensors 100, and a ninth variable threshold value V9 of the ninth touch sensor 109. An X axis indicates a time, and a Y axis indicates touch data values.

FIG. 13B illustrates a graph indicating a determining operation of the processor 1200 with respect to whether or not a touch input is generated on the touch sensors. An X axis indicates a time, and a Y axis indicates a value of determining whether or not a touch input is generated. In an embodiment, when the processor 1200 determines that a touch input is normal, the processor 1200 may indicate the value of the determining as 1, and when the processor 1200 determines that a touch input is abnormal, the processor 1200 may indicate the value of the determining as 0, for example.

In an embodiment, with respect to the determining of whether or not the touch input is generated at point ① (the time between 254 and 323), the ninth touch data value D9 of the ninth touch sensor 109 may be 65, and the ninth default threshold value R9 of the ninth touch sensor 109 may be 40, for example. The average touch data value A of the plurality of touch sensors 100 at point ① may be 32. The ninth variable threshold value V9 of the ninth touch sensor 109 at point ①, obtained by adding the average touch data value A to the ninth default threshold value R9, may be 72. Considering that the average touch data value A at point ① is 32, it may be understood that the wet steam 10 falls down on the plurality of touch sensors 100 at point ①.

The processor 1200 may compare the ninth touch data value D9 of the ninth touch sensor 109 with the ninth variable threshold value V9 of the ninth touch sensor 109 Because the ninth touch data value D9 is less than the ninth variable threshold value V9, the processor 1200 may determine that a touch input is not generated on the ninth touch sensor 109 at point ① (the time between 254 and 323) or may determine that a touch input with respect to the ninth touch sensor 109 is abnormal and ignore the touch input with respect to the ninth touch sensor 109.

In the illustrated embodiment of the disclosure, even when the ninth touch data value D9 of the ninth touch sensor 109 exceeds the ninth default threshold value R9 of the ninth touch sensor 109 at point ① (the time between 254 and 323), the processor 1200 may ignore the touch input with respect to the ninth touch sensor 109, when the ninth touch data value D9 of the ninth touch sensor 10 is equal to or less than the ninth variable threshold value V9.

By using the process described above, the processor 1200 may determine that a touch input is not generated on the ninth touch sensor 109 at point ② (the time between 547 and 575), and point ③ (the time between 897 and 981) and may ignore the touch input on the ninth touch sensor 109.

In an embodiment of the disclosure, when there is an abnormal change of the touch data value in the wireless power transmission apparatus 1000 due to the wet steam 10, the touch data values of all of the plurality of touch sensors 100 may be increased. In an embodiment of the disclosure, in the wireless power transmission apparatus 1000, a variable threshold value may be a criterion for determining whether or not a touch input is generated. The variable threshold value may be determined by taking into account increased touch data values. In detail, the variable threshold value may be determined by reflecting an average touch data value in addition to a default threshold value. Thus, even when the touch data value of each of the plurality of touch sensors 100 is increased due to an abnormal touch input, the wireless power transmission apparatus 1000 may ignore the touch input, when the touch data value does not exceed the variable threshold value.

Figure 14:
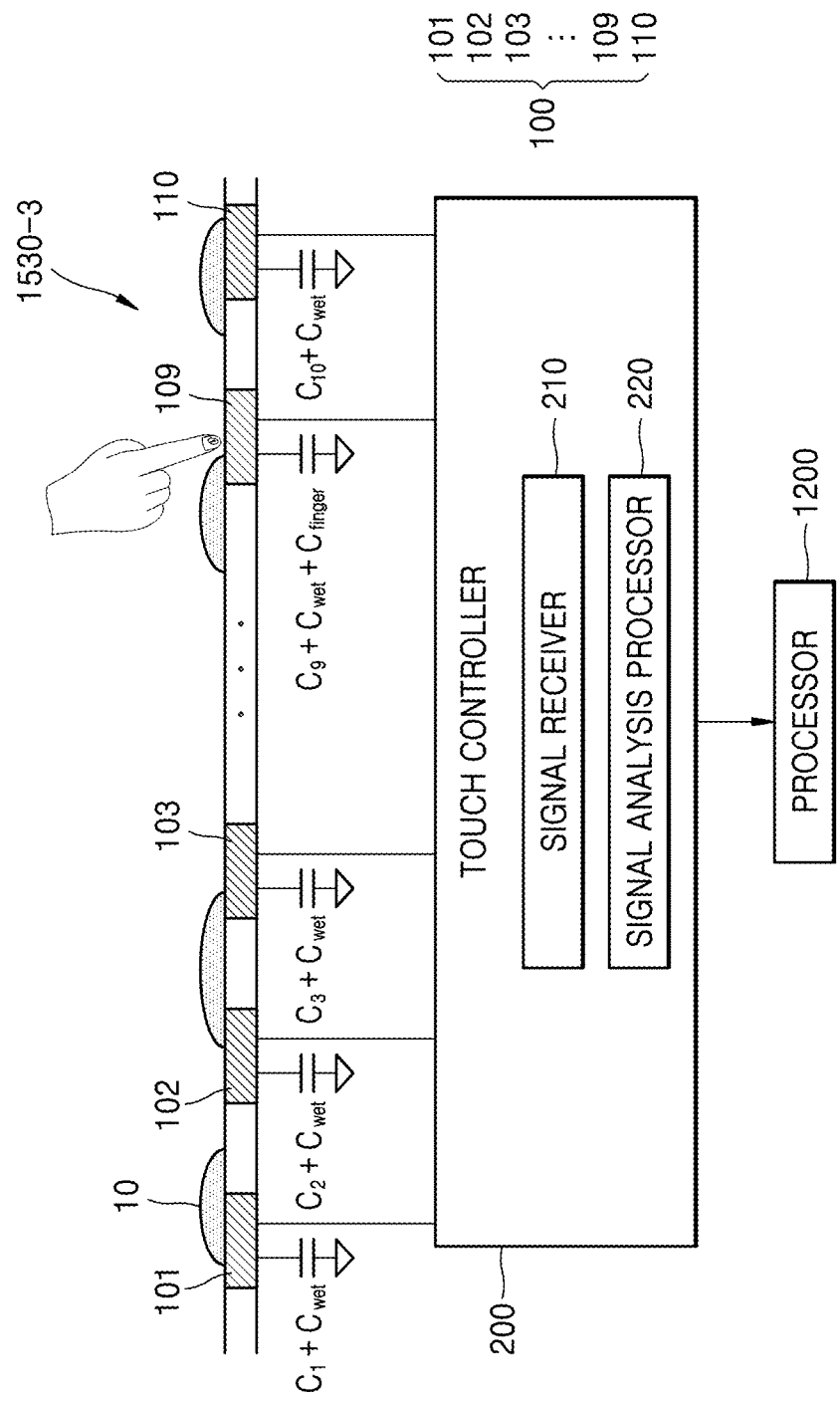
FIG. 14 is a conceptual diagram illustrating an embodiment of a situation in which there is a user's touch to a wireless power transmission apparatus, and wet steam falls down on the wireless power transmission apparatus, according to the disclosure.
Figure 15A:
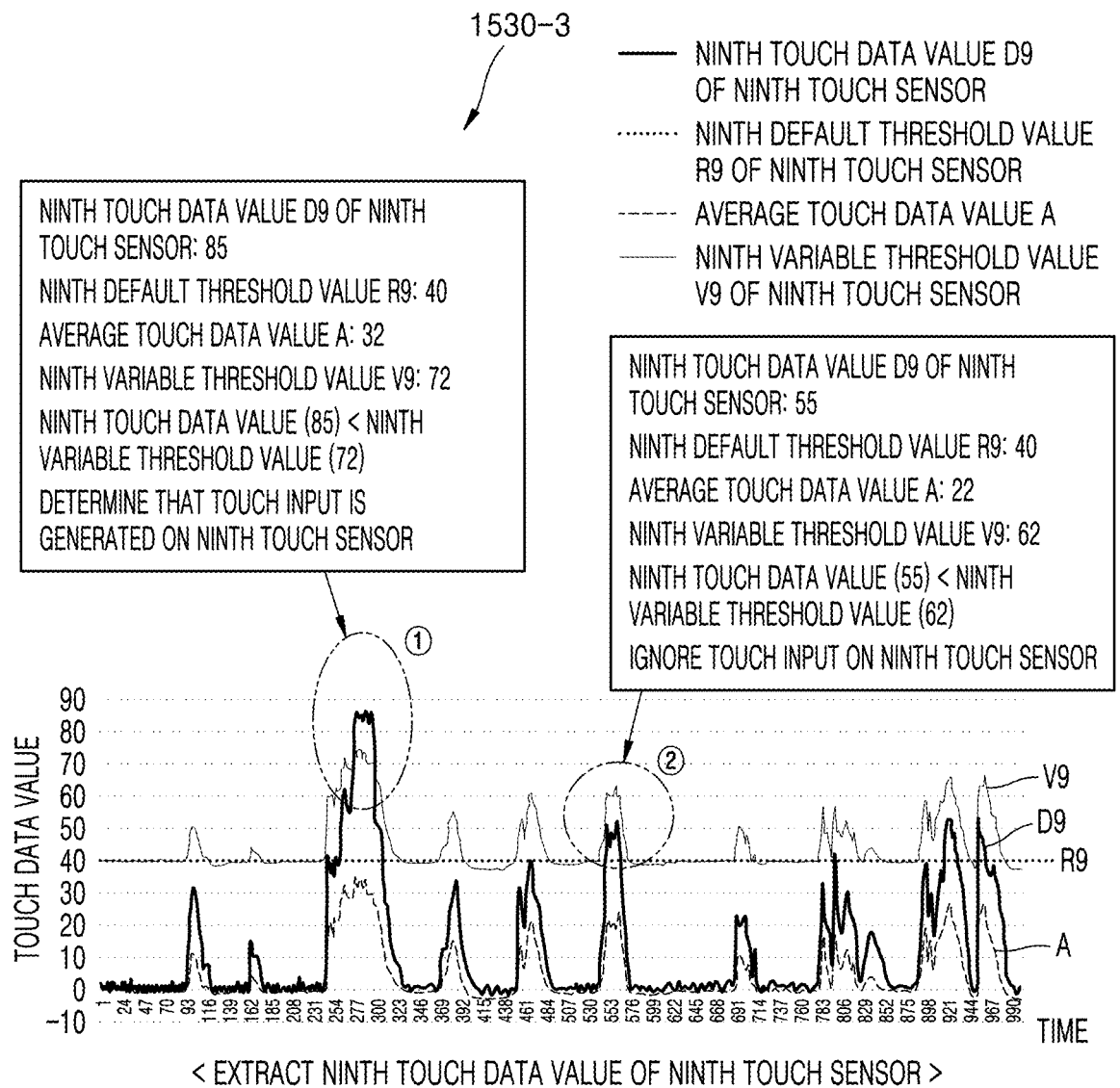
FIG. 15A is an example graph of an extracted touch data value of any one touch sensor from among a plurality of touch sensors according to FIG. 14.
Figure 15B:
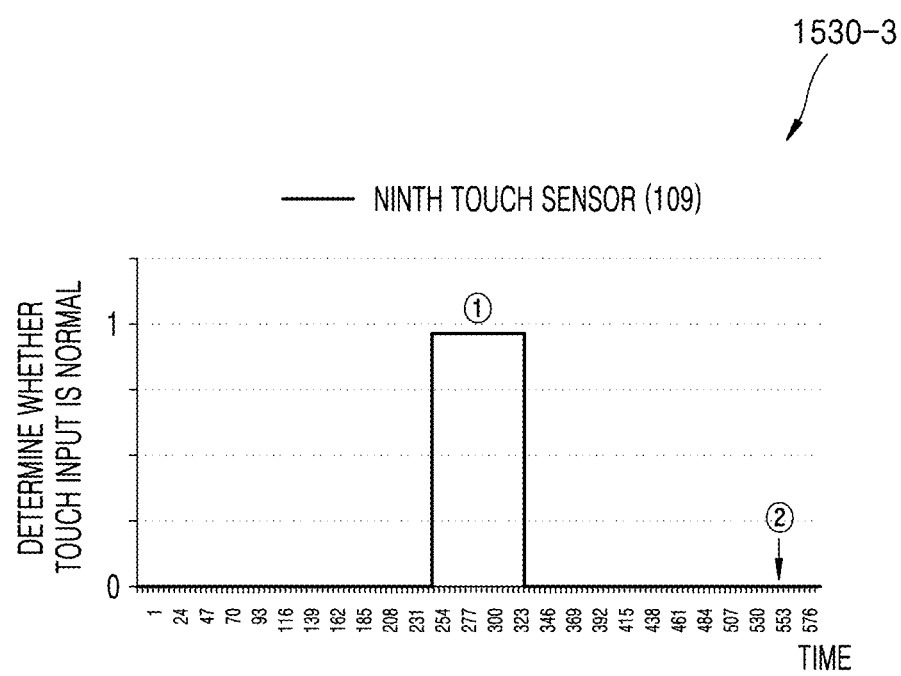
FIG. 15B is an example graph indicating whether or not a touch input is generated, according to the touch data value of any one touch sensor from among the plurality of touch sensors according to FIG. 14.

FIG. 14 is a conceptual diagram illustrating an embodiment of a situation in which there is a user's touch and wet steams falls down on the wireless power transmission apparatus 1000 according to the disclosure. FIG. 15A is an example graph of an extracted touch data value of any one touch sensor from among the plurality of touch sensors 100 according to FIG. 14. FIG. 15B is an example graph indicating whether or not a touch input is generated, according to the touch data value of any one touch sensor from among the plurality of touch sensors 100 according to FIG. 14.

FIG. 14 to FIG. 15B illustrate a case in which the wet steam 10 falls down on the plurality of touch sensors 100 of the touch panel 1530-3 in an embodiment according to the disclosure, and there is a user's touch on the ninth touch sensor 109, which is one from among the plurality of touch sensors 100.

In FIG. 14, each of the plurality of touch sensors 100 included in the touch panel 1530-3 may have a parasitic capacitance Cn. The same features as the features described with reference to FIG. 7 will not be repeatedly described.

In an embodiment of the disclosure, when the wet steam 10 falls down on the plurality of touch sensors 100, a wet steam capacitance Cwet may be parallelly added to the parasitic capacitance Cn of each of the plurality of touch sensors 100.

In an embodiment of the disclosure, when there is a user's touch on any one touch sensor from among the plurality of touch sensors 100, a finger capacitance Cfinger may be parallelly added to the parasitic capacitance Cn of the corresponding touch sensor.

In an embodiment, a capacitance of the first touch sensor 101 may be C1+Cwet, which is a value obtained by summing a parasitic capacitance C1 with the wet steam capacitance Cwet, for example. A capacitance of the second touch sensor 102 may be C2+Cwet, which is a value obtained by summing a parasitic capacitance C2 with the wet steam capacitance Cwet. A capacitance of the third touch sensor 103 may be C3+Cwet, which is a value obtained by summing a parasitic capacitance C3 with the wet steam capacitance Cwet. A capacitance of the tenth touch sensor 110 may be C10+Cwet, which is a value obtained by summing a parasitic capacitance C10 with the wet steam capacitance Cwet.

In an embodiment, a capacitance of the ninth touch sensor 109 may be C9+Cwet+Cfinger, which is a sum of a parasitic capacitance C9, the wet steam capacitance Cwet, and the finger capacitance Cfinger, for example.

In an embodiment of the disclosure, the touch controller 200 may measure a charging time increased by the change of capacitance in each of the plurality of touch sensors 100 and may convert the measured charging time into a frequency signal to calculate a touch data value of each of the plurality of touch sensors 100. FIG. 15A illustrates a graph indicating a ninth touch data value of the ninth touch sensor 109 extracted from among the touch data values of the plurality of touch sensors 100.

FIG. 15A illustrates a ninth touch data value D9 of the ninth touch sensor 109, a ninth default threshold value R9 of the ninth touch sensor 109, an average touch data value A of the plurality of touch sensors 100, and a ninth variable threshold value V9 of the ninth touch sensor 109. An X axis indicates a time, and a Y axis indicates touch data values.

FIG. 15B illustrates a graph indicating a determining operation of the processor 1200 with respect to whether or not a touch input is generated on a touch sensor. An X axis indicates a time, and a Y axis indicates a value of determining whether or not a touch input is generated.

In an embodiment, with respect to the determining of whether or not the touch input is generated at point ① (a time between 254 and 323), the ninth touch data value D9 of the ninth touch sensor 109 may be 75, and the ninth default threshold value R9 of the ninth touch sensor 109 may be 40, for example. The average touch data value A of the plurality of touch sensors 100 at point ① may be 32. The ninth variable threshold value V9 of the ninth touch sensor 109 at point ①, obtained by adding the average touch data value A to the ninth default threshold value R9, may be 72.

The processor 1200 may compare the ninth touch data value D9 of the ninth touch sensor 109 with the ninth variable threshold value V9 of the ninth touch sensor 109. Because the ninth touch data value D9 is greater than the ninth variable threshold value V9, the processor 1200 may determine that a user's touch input is generated on the ninth touch sensor 109 at point ① (the time between 254 and 323) and may perform an operation corresponding to the touch input.

With respect to the determining of whether or not the touch input is generated at point ② (a time corresponding to 553), the ninth touch data value D9 of the ninth touch sensor 109 may be 55, and the ninth default threshold value R9 of the ninth touch sensor 109 may be 40. The average touch data value A of the plurality of touch sensors 100 at point ② may be 22. The ninth variable threshold value V9 of the ninth touch sensor 109 at point ②, obtained by adding the average touch data value A to the ninth default threshold value R9, may be 62.

The processor 1200 may compare the ninth touch data value D9 of the ninth touch sensor 109 with the ninth variable threshold value V9 of the ninth touch sensor 109. Because the ninth touch data value D9 is less than the ninth variable threshold value V9, the processor 1200 may determine that a touch input is not generated on the ninth touch sensor 109 at point ② (the time corresponding to 553) or may determine that a touch input with respect to the ninth touch sensor 109 is abnormal and ignore the touch input with respect to the ninth touch sensor 109.

In the illustrated embodiment of the disclosure, even when the ninth touch data value D9 of the ninth touch sensor 109 exceeds the ninth default threshold value R9 of the ninth touch sensor 109 at point ② (the time corresponding to 553), the processor 1200 may ignore the touch input with respect to the ninth touch sensor 109, when the ninth touch data value D9 of the ninth touch sensor 10 is equal to or less than the ninth variable threshold value V9.

Referring to FIG. 15B, the processor 1200 may determine that there is a touch input on the ninth touch sensor 109 point ① (the time between 254 and 323). The processor 1200 may determine that touch inputs are not generated on the ninth touch sensor 109 at remaining points. In an embodiment, the processor 1200 may determine that a touch input is not generated on the ninth touch sensor 109 at point ② (the time corresponding to 553) and may ignore the touch input, for example.

In an embodiment of the disclosure, the wireless power transmission apparatus 1000 may compare the touch data value of each of the plurality of touch sensors 100 with the variable threshold value of each of the plurality of touch sensors 100, in order to determine whether or not a touch input is generated. When the touch data value of each of the plurality of touch sensors 100 is increased by the wet steam 10, the variable threshold value of each of the plurality of touch sensors 100 may also be increased.

In an embodiment of the disclosure, the wireless power transmission apparatus 1000 may determine whether or not a user's touch input is generated, based on the variable threshold value, which is increased by the average touch data value from the default threshold value. Thus, a malfunction of the touch panel 1530 due to the wet steam 10 may be minimized, and a normal touch input of a user may be recognized.

Figure 16:
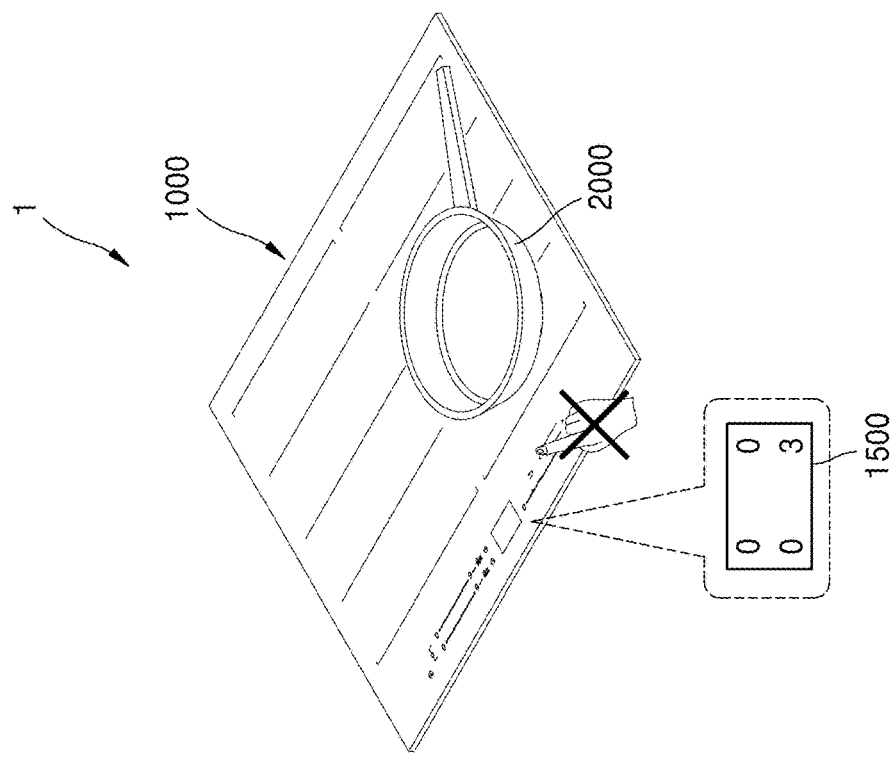
FIG. 16 is a diagram of an embodiment of a cooking system according to the disclosure.
Figure 16:
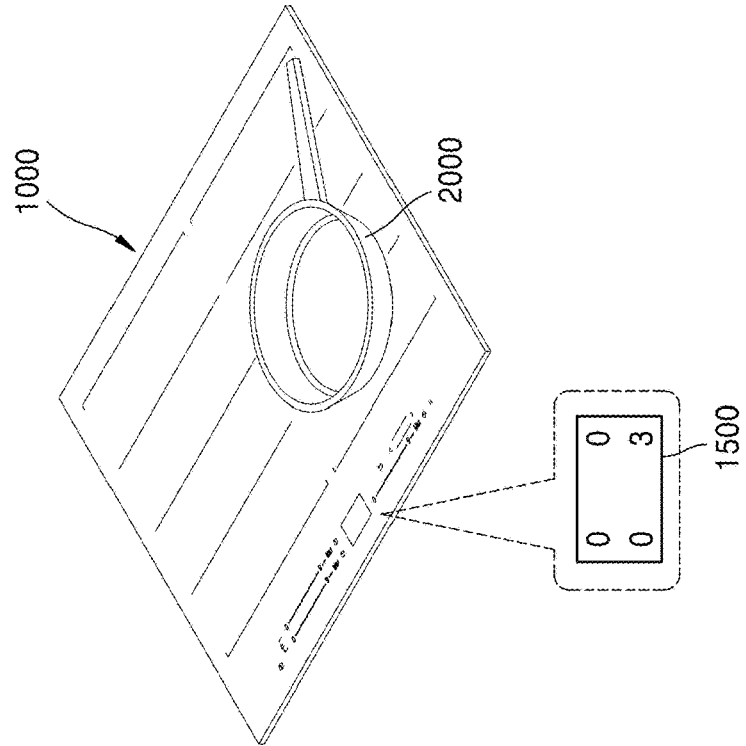

FIG. 16 is a diagram of an embodiment of the cooking system 1 according to the disclosure.

In the cooking system 1 in an embodiment according to the disclosure, even when wet steam falls down on the plurality of touch sensors 100 on the top plate of the wireless power transmission apparatus 1000, the wireless power transmission apparatus 1000 may not determine that a touch input is generated, when there is no touch input from a user with respect to a predetermined touch sensor. In an embodiment, when the user does not select a touch button for adjusting a power level with respect to a cooking zone of a fourth quadrant, the power level with respect to the cooking zone of the fourth quadrant may be constantly maintained as 3, even when wet steam falls down on the touch button for adjusting the power level of the cooking zone of the fourth quadrant, for example.

Figure 17:
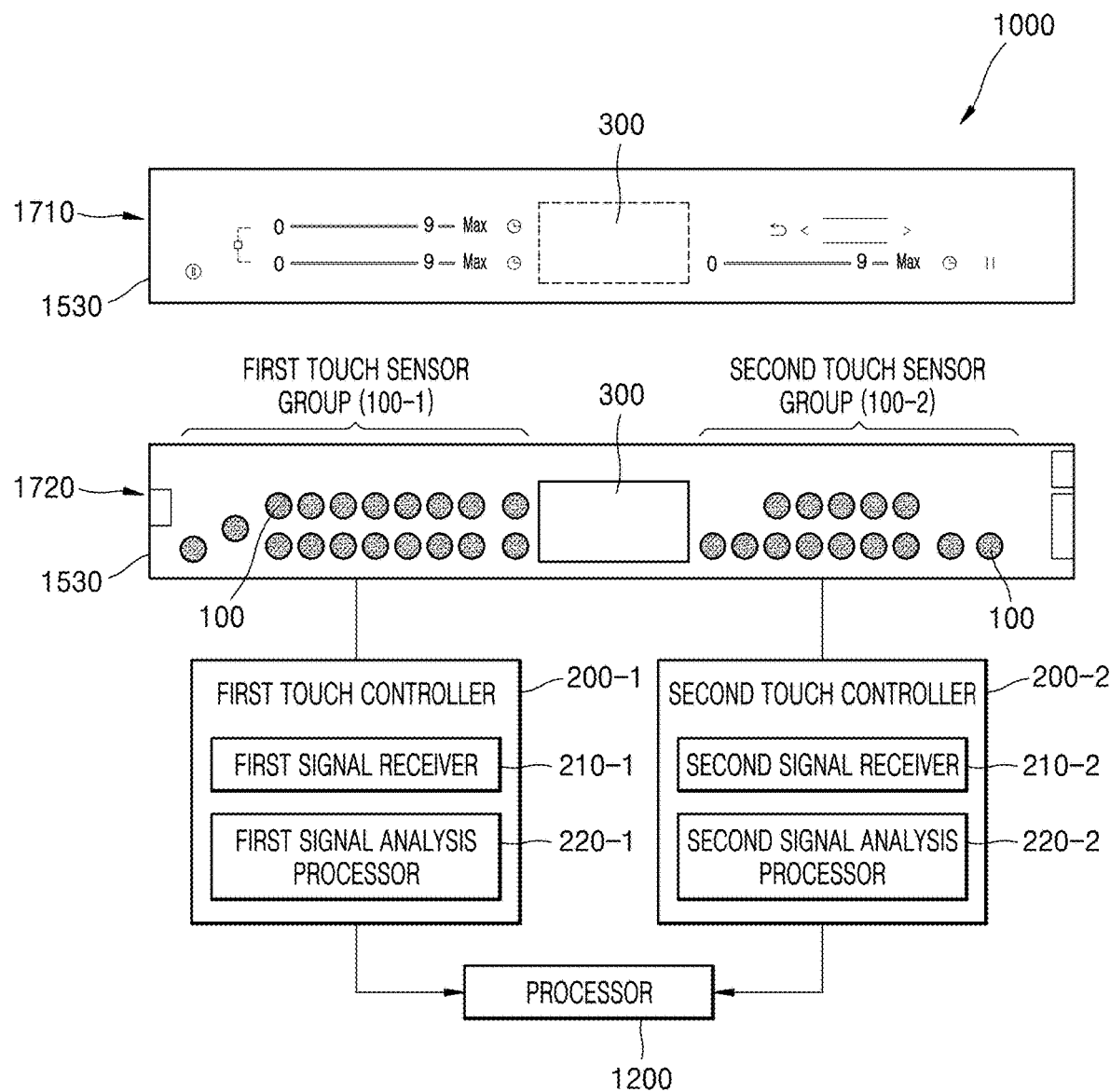
FIG. 17 is a schematic plan view of an embodiment of a touch panel and a display of a wireless power transmission apparatus according to the disclosure.

FIG. 17 is a schematic plan view of an embodiment of the touch panel 1530 and the display 300 of the wireless power transmission apparatus 1000 according to the disclosure.

Referring to a reference numeral 1710 of FIG. 17, the wireless power transmission apparatus 1000 in an embodiment of the disclosure may include a top plate including tempered glass, such as ceramic glass, etc., and the plurality of touch sensors 100 may be respectively mapped with touch buttons for guiding configured functions. In an embodiment, the configured functions may include menu selection, confirmation, cancellation, power level adjustment, cooking time reservation, a cooking pause, etc., for example.

Referring to the touch panel 1530 of the wireless power transmission apparatus 1000 illustrated in FIG. 17, the touch panel 1530 may include two touch controllers, that is, first and second touch controllers 200-1 and 200-2, and the plurality of touch sensors 100 may be divided into two groups and may be connected to the different controllers 200-1 and 200-2.

In an embodiment, referring to a reference numeral 1720 of FIG. 17, the touch panel 1530 may include a first touch sensor group 100-1 including 18 touch sensors and a second touch sensor group 100-2 including 14 touch sensors, for example. Also, the touch panel 1530 may include the first touch controller 200-1 connected to the first touch sensor group 100-1 and the second touch controller 200-2 connected to the second touch sensor group 100-2. The numbers and shapes of touch sensors included in the first touch sensor group 100-1 and the second touch sensor group 100-2 are not limited thereto. The numbers and shapes of touch sensors may be variously modified according to configured functions of the wireless power transmission apparatus 1000.

The touch sensors included in the first touch sensor group 100-1 may be connected to the first touch controller 200-1. The first touch controller 200-1 may sequentially scan the touch sensors included in the first touch sensor group 100-1 and calculate a touch data value according to a capacitance of each touch sensor. In an embodiment, a first signal receiver 210-1 of the first touch controller 200-1 may receive the capacitances from the touch sensors of the first touch sensor group 100-1, for example. A first signal analysis processor 220-1 of the first touch controller 200-1 may calculate a charging time changed by the capacitance into a touch data value. The first touch controller 200-1 may transmit, to the processor 1200, the calculated touch data value of each touch sensor included in the first touch sensor group 100-1.

The touch sensors included in the second touch sensor group 100-2 may be connected to the second touch controller 200-2. The second touch controller 200-2 may sequentially scan the touch sensors included in the second touch sensor group 100-2 and calculate a touch data value according to a capacitance of each touch sensor. In an embodiment, a second signal receiver 210-2 of the second touch controller 200-2 may receive the capacitances from the touch sensors of the second touch sensor group 100-2, for example. A second signal analysis processor 220-2 of the second touch controller 200-2 may calculate a charging time changed by the capacitance into a touch data value. The second touch controller 200-2 may transmit, to the processor 1200, the calculated touch data value of each touch sensor included in the second touch sensor group 100-2.

In an embodiment of the disclosure, the processor 1200 may obtain each of a first average touch data value of the touch sensors included in the first touch sensor group 100-1 and a second average touch data value of the touch sensors included in the second touch sensor group 100-2. Depending on whether the plurality of touch sensors 100 are included in the first touch sensor group 100-1 or the second touch sensor group 100-2, the average touch data value of the touch sensors may be different, and thus, variable threshold values of the touch sensors may be different.

In an embodiment, the processor 1200 may obtain, from the first touch controller 200-1, the touch data values of the touch sensors included in the first touch sensor group 100-1, for example. The processor 1200 may obtain the first average touch data value, which is an average of the touch data values of all of the touch sensors in the first touch sensor group 100-1. The processor 1200 may determine a first variable threshold value, which is obtained by adding the first average touch data value to a default threshold value of any one sensor from among the plurality of touch sensors 100 included in the first touch sensor group 100-1. The processor 1200 may determine whether or not a touch input is generated on any one touch sensor, by comparing the touch data value of the touch sensor with the first variable threshold value.

In an embodiment of the disclosure, the processor 1200 may obtain, from the second touch controller 200-2, the touch data values of the touch sensors included in the second touch sensor group 100-2. The processor 1200 may obtain the second average touch data value, which is an average of the touch data values of all of the touch sensors in the second touch sensor group 100-2. The processor 1200 may determine a second variable threshold value, which is obtained by adding the second average touch data value to a default threshold value of any one sensor from among the plurality of touch sensors 100 included in the second touch sensor group 100-2. The processor 1200 may determine whether or not a touch input is generated on any one touch sensor, by comparing the touch data value of the touch sensor with the second variable threshold value.

In an embodiment of the disclosure, the first average touch data value and the second average touch data value may be different from each other. However, the disclosure is not limited thereto, and the first average touch data value and the second average touch data value may be the same as each other.

In an embodiment, when the touch data value of any one touch sensor in the first touch sensor group 100-1 exceeds the first variable threshold value with respect to the touch sensor, the processor 1200 may determine that a touch input is generated on the corresponding touch sensor and perform an operation corresponding to the touch input (an operation corresponding to a touch button mapped with the corresponding touch sensor), for example.

However, when the touch data value of any one touch sensor in the first touch sensor group 100-1 is equal to or less than the first variable threshold value with respect to the touch sensor, the processor 1200 may determine that a touch input is not generated on the corresponding touch sensor or may determine that a touch input on the corresponding touch sensor is abnormal and ignore the touch input.

In an embodiment of the disclosure, when the touch data value of any one touch sensor in the second touch sensor group 100-2 exceeds the second variable threshold value with respect to the touch sensor, the processor 1200 may determine that a touch input on the corresponding touch sensor is normal and may perform an operation corresponding to the touch input.

In an embodiment, when the touch data value of any one touch sensor in the second touch sensor group 100-2 is equal to or less than the second variable threshold value with respect to the touch sensor, the processor 1200 may determine that a touch input is not generated on the corresponding touch sensor or may determine that a touch input on the corresponding touch sensor is abnormal and ignore the touch input, for example.

Although it is not limited thereto, the wireless power transmission apparatus 1000 may include at least one dummy touch sensor, in an embodiment according to the disclosure. In an embodiment, the second touch sensor group 100-2 may include as many dummy touch sensors as desired to match the number of touch sensors of the first touch sensor group 100-1, for example. In an embodiment, the second touch sensor group 100-2 may include four dummy touch sensors, for example. An embodiment in which the touch panel 1530 includes the dummy touch sensors will be described in detail below with reference to FIGS. 21 and 22.

Figure 18:
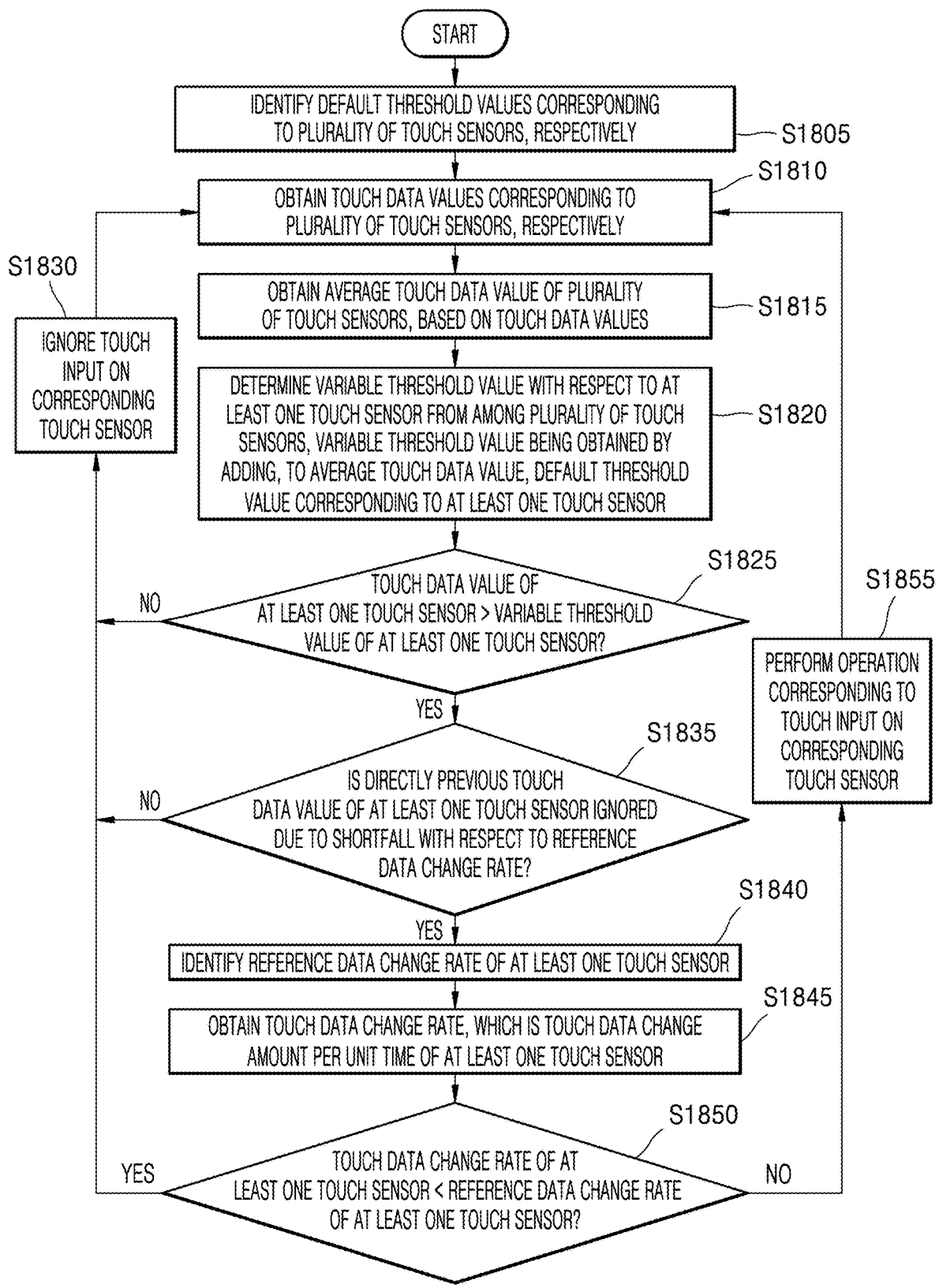
FIG. 18 is a flowchart of an embodiment of a method, performed by a wireless power transmission apparatus, of determining whether or not a touch input is generated, according to the disclosure.

FIG. 18 is a flowchart of an embodiment of a method, performed by the wireless power transmission apparatus 1000, of determining whether or not a touch input is generated, in an embodiment according to the disclosure.

The wireless power transmission apparatus 1000 in an embodiment of the disclosure may determine whether or not a touch input is generated on at least one touch sensor, by taking into account not only a variable threshold value of each of the plurality of touch sensors 100, but also a reference data change rate of each of the plurality of touch sensors 100.

In operation S1805, the processor 1200 in an embodiment of the disclosure may identify a default threshold value corresponding to each of the plurality of touch sensors 100. The processor 1200 may identify the default threshold values corresponding to the plurality of touch sensors 100, respectively, the default threshold values being stored in the memory 1600 of the wireless power transmission apparatus 1000. Operation S1805 may be substantially the same as operation S610 of FIG. 6.

In operation S1810, the processor 1200 in an embodiment of the disclosure may obtain a plurality of touch data values corresponding to the plurality of touch sensors 100, respectively. Operation S1810 may be substantially the same as operation S620 of FIG. 6.

In operation S1815, the processor 1200 in an embodiment of the disclosure may obtain an average touch data value of the plurality of touch sensors 100, based on the touch data values. Operation S1815 may be substantially the same as operation S630 of FIG. 6.

In operation S1820, the processor 1200 in an embodiment of the disclosure may determine a variable threshold value of each of the plurality of touch sensors 100, the variable threshold value being obtained by adding, to the average touch data value, the default threshold value of each of the plurality of touch sensors 100. Operation S1820 may be substantially the same as operation S640 of FIG. 6.

In operation S1825, the processor 1200 in an embodiment of the disclosure may compare the touch data value with respect to at least one touch sensor with the variable threshold value with respect to the at least one touch sensor.

In operations S1825 and S1830, when the touch data value of each touch sensor is equal to or less than the variable threshold value of each touch sensor, the processor 1200 in an embodiment of the disclosure may ignore the touch input on the corresponding touch sensor. Operation S1830 may be substantially the same as operation S660 of FIG. 6.

When the touch data value of each touch sensor exceeds the variable threshold value of each touch sensor, the processor 1200 may proceed to operation S1835.

In operation S1835, when the touch data value of at least one touch sensor exceeds the variable threshold value, the processor 1200 in an embodiment of the disclosure may determine whether a directly previous touch data value of the at least one touch sensor is ignored due to a shortfall with respect to a reference data change rate. In an embodiment, when the directly previous touch data value of the at least one touch sensor is ignored, because a touch data change rate based on the directly previous touch data value of the at least one touch sensor is less than the reference data change rate, the processor 1200 may ignore a current touch input, in operation S1830, for example. However, in another embodiment, operation S1835 may be omitted.

In an embodiment, in order to determine, based on a current touch data value (e.g., a $k^{th}$ touch data value) of at least one touch sensor, whether or not a touch input is generated, the processor 1200 may refer to a result of a directly previous touch data value (e.g., a $k-1^{th}$ touch data value) of the at least one touch sensor, for example. When a touch data change rate based on the $k-1^{th}$ touch data value of the at least one touch sensor is less than the reference data change rate, and thus, the $k-1^{th}$ touch data value is ignored, the processor 1200 may ignore a touch input on the at least one touch sensor (here, k is a natural number greater than or equal to 2).

Accordingly, when the k−1$^{th}$ touch data value is drastically increased due to wet steam, the processor 1200 may determine that a change of k$^{th}$ touch data is due to an abnormal touch input, even when the k$^{th}$ touch data value is drastically increased, and may ignore a k$^{th}$ touch input on the corresponding touch sensor.

In other words, when a reason of ignorance of the k−1$^{th}$ touch data value of a touch sensor is the shortfall with respect to the reference data change rate, the processor 1200 may ignore the k$^{th}$ touch data value of the touch sensor. The process in which a touch data value of one touch sensor is ignored based on a shortfall with respect to a reference data change rate will be described in detail with reference to operations S1840, S1845, and S1850 below.

Unlike this, when a reason of ignorance of the k−1$^{th}$ touch data value of a touch sensor is, e.g., a shortfall with respect to a variable threshold value, the processor 1200 may not ignore the k$^{th}$ touch data value of the touch sensor. The processor 1200 may separately determine whether or not to ignore a touch input by comparing the k$^{th}$ touch data value of a touch sensor with a k$^{th}$ variable threshold value of the touch sensor.

In operation S1840, the processor 1200 may identify a reference data change rate of at least one touch sensor. The processor 1200 may identify, from the memory 1600, reference data change rates corresponding to the plurality of touch sensors 100, respectively, the reference date change rates being stored in the memory 1600.

In an embodiment of the disclosure, the reference data change rate is a value designed according to the characteristics of each of the plurality of touch sensors 100 included in the wireless power transmission apparatus 1000, and may be defined as a touch data change amount per unit time or a gradient of touch data values, which may be used as a reference for determining whether or not a touch input is generated. The reference data change rate may be different for each touch sensor. The reference data change rate may have a predetermined constant value with respect to a touch sensor.

In operation S1845, the processor 1200 may obtain a touch data change rate, which is a touch data change amount per unit time of at least one touch sensor.

In an embodiment of the disclosure, the touch data change rate may be the touch data change amount according to time and may have a gradient value of a straight line of a current touch data value (e.g., a k$^{th}$ touch data value) and a previous touch data value (e.g., a k−2$^{th}$ touch data value). In an embodiment, the touch data change rate may be obtained according to Equation 1 that is a general formula for obtaining a gradient of a straight line, for example.

[Equation 1]

$$\text{touch data change rate} = \frac{y2 - y1}{x2 - x1} = \frac{(kth \text{ touch data value}) - (k - 2th \text{ touch data value})}{k - (k - 2)}$$

In Equation 1, y1 and y2 are Y-intercept values, and x1 and x2 are X-intercept values. k may be defined as a cycle by which the processor 1200 scans all of the touch sensors.

In an embodiment of the disclosure, the touch data change rate is not limited to Equation 1. In an embodiment, the touch data change rate of at least one touch sensor may be obtained by a change rate between the k$^{th}$ touch data value and a k−3$^{th}$ touch data value, for example.

In operation 1850, the processor 1200 may compare the touch data change rate of the at least one touch sensor with the reference data change rate of the at least one touch sensor. The processor 1200 may determine whether or not a user's k$^{th}$ touch input with respect to the at least one touch sensor is generated, based on a result of the comparing.

In an embodiment, when the touch data change rate with respect to the at least one touch sensor is less than the reference data change rate of the at least one touch sensor, the processor 1200 may ignore the k$^{th}$ touch input on the corresponding touch sensor, for example. In an embodiment, the processor 1200 may determine that a touch input is not generated on the corresponding touch sensor or may determine that a touch input on the corresponding touch sensor is abnormal and ignore the touch input on the corresponding touch sensor in operation S1830, for example.

In an embodiment, when the touch data change rate with respect to the at least one touch sensor is equal to or greater than the reference data change rate with respect to the at least one touch sensor, the processor 1200 may determine that a touch input on the corresponding touch sensor is normal and may perform an operation corresponding to the touch input in operation S1855, for example.

In an embodiment of the disclosure, wet steam may slowly fall down on the touch panel 1530, as microfluidic particles may slowly accumulate, and may slowly evaporate. Generally, a touch data value of a touch sensor, which is increased or decreased by the wet steam, may be slowly increased or slowly decreased. In other words, a touch data change amount (that is, a touch data change rate) according to time due to wet steam may have a relatively smooth gradient. In an embodiment, the touch data change amount (that is, the touch data change rate) according to time due to the wet steam may be less than a touch data change rate due to a user's touch input, for example. Thus, the processor 1200 may determine whether or not a touch input on a touch sensor is generated, by comparing the touch data change amount of the touch sensor with a predetermined reference data change rate.

In an embodiment, when the touch data change rate of the touch sensor is less than the reference data change rate, the processor 1200 may determine that a touch input on the corresponding touch sensor is abnormal and ignore the touch input on the corresponding touch sensor, for example.

In an embodiment, when the touch data change rate of the touch sensor is equal to or greater than the reference data change rate, the processor 1200 may determine that a touch input on the corresponding touch sensor is normal and perform an operation corresponding to the touch input, for example.

After the processor 1200 determines whether or not a touch input is generated on a touch sensor during a first cycle, the processor 1200 may determine whether or not a touch input is generated on the touch sensor during a second cycle that is subsequent to the first cycle. In an embodiment, after the processor 1200 scans k$^{th}$ touch data values of the touch sensors, the processor 1200 may scan k+1$^{th}$ touch data values corresponding to a subsequent cycle, for example.

When a touch data change rate of any one touch sensor from among the plurality of touch sensors 100 is less than a reference data change rate, the wireless power transmission apparatus 1000 in an embodiment of the disclosure may ignore a touch input on the corresponding touch sensor. Thus, a malfunction of the touch panel 1530 due to wet steam may be minimized. The wireless power transmission apparatus 1000 may ignore the touch input on the corresponding touch sensor, even when the touch data value of any one touch sensor from among the plurality of touch sensors 100 is greater than the variable threshold value.

In an embodiment of the disclosure, even when the touch data change rate of the touch sensor exceeds the reference data change rate because wet steam rapidly falls down or evaporates forcibly by a fan, etc., the average touch data value of the touch sensor may be increased, and thus, a touch input may be determined to be abnormal, by taking into account the variable threshold value.

Figure 19:
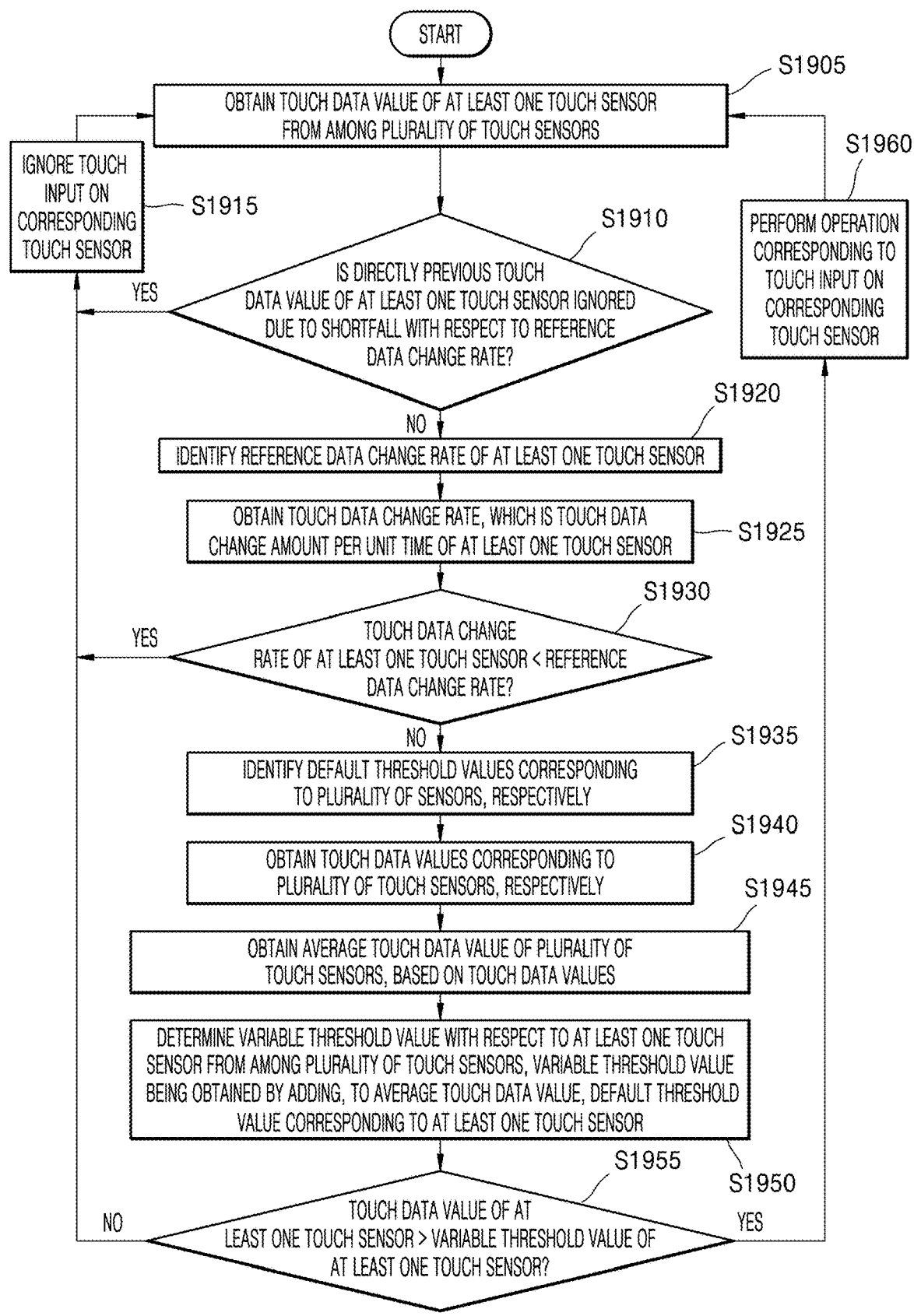
FIG. 19 is a flowchart of an embodiment of a method, performed by a wireless power transmission apparatus, of determining whether or not a touch input is generated, according to the disclosure.

FIG. 19 is a flowchart of an embodiment of a method, performed by the wireless power transmission apparatus 1000, of determining whether or not a touch input is generated, according to the disclosure.

An embodiment of FIG. 19 is different from the embodiment of FIG. 18, in that the wireless power transmission apparatus 1000 in an embodiment of the disclosure may compare touch data values of touch sensors with variable threshold values, when touch data change rates exceed reference data change rates as a result of comparing the touch data change rates of the touch sensors with the reference data change rates. Hereinafter, the same features will not be repeatedly described, and different features will be mainly described.

In operation S1905, the processor 1200 may obtain a touch data value of at least one touch sensor from among the plurality of touch sensors 100.

In operation S1910, the processor 1200 may determine whether or not a directly previous touch data value of the at least one touch sensor is ignored because of a shortfall with respect to the reference data change rate. However, operation S1910 may be omitted.

In an embodiment of the disclosure, in order to determine, based on a current touch data value (e.g., a $k^{th}$ touch data value) of at least one touch sensor, whether or not a touch input is generated, the processor 1200 may refer to a result of a directly previous touch data value (e.g., a $k-1^{th}$ touch data value) of the at least one touch sensor.

In operation S1915, the processor 1200 may ignore a $k^{th}$ touch input on the at least one touch sensor, when a $k-1^{th}$ touch data value of the at least touch sensor is ignored due to a shortfall with respect to the reference data change rate.

When a reason of ignorance of the $k-1^{th}$ touch data value of the at least one touch sensor is not the shortfall with respect to the reference data change rate, the processor 1200 may proceed to operation S1920.

In operation S1920, the processor 1200 may identify the reference data change rate of the at least one touch sensor.

In operation S1925, the processor 1200 may obtain the touch data change rate, which is a touch data change amount per unit time of the at least one touch sensor.

In an embodiment, the processor 1200 may obtain the touch data change rate between the $k^{th}$ touch data value and a $k-2^{th}$ touch data value of the at least one touch sensor, for example, but the disclosure is not limited thereto, and the touch data change rate of at least one touch sensor may be obtained by a change rate between the $k^{th}$ touch data value and a $k-3^{th}$ touch data value.

In operation 1930, the processor 1200 may compare the touch data change rate of the at least one touch sensor with the reference data change rate of the at least one touch sensor. The processor 1200 may determine, based on a result of the comparing, whether or not the $k^{th}$ touch input is generated with respect to the at least one touch sensor.

In an embodiment, when the touch data change rate with respect to the at least one touch sensor is less than the reference data change rate of the at least one touch sensor, the processor 1200 may ignore the $k^{th}$ touch input on the corresponding touch sensor, for example. In an embodiment, the processor 1200 may determine that a touch input is generated on the corresponding touch sensor and may ignore the touch input in operation S1915, for example.

In an embodiment, when the touch data change rate of the at least one touch sensor is equal to or greater than the reference data change rate of the at least one touch sensor, the processor 1200 may proceed to operation S1935, for example.

In operation S1935, the processor 1200 may identify default threshold values corresponding to the plurality of touch sensors 100, respectively.

In operation S1940, the processor 1200 may obtain touch data values corresponding to the plurality of touch sensors 100, respectively.

In operation S1945, the processor 1200 may obtain an average touch data value of the plurality of touch sensors 100, based on the touch data values of the plurality of touch sensors 100.

In operation S1950, the processor 1200 may determine a variable threshold value of each touch sensor 100 by adding, to the average touch data value, the default threshold value of each touch sensor 100.

In operation S1955, the processor 1200 may compare the touch data value with respect to at least one touch sensor with the variable threshold value of the at least one touch sensor.

In operation S1915, when the touch data value of each touch sensor is equal to or less than the variable threshold value of each touch sensor, the processor 1200 may ignore a touch input on the corresponding touch sensor.

In operations S1960, when the touch data value of each touch sensor is greater than the variable threshold value of each touch sensor, the processor 1200 may determine that a touch input is generated on the corresponding touch sensor.

In an embodiment of the disclosure, even when the touch data change rate of the touch sensor exceeds the reference data change rate because wet steam rapidly falls down or evaporates forcibly by a fan, etc., the average touch data value of the touch sensor may be increased, and thus, a touch input may be determined to be abnormal, by taking into account the variable threshold value.

Figure 20A:
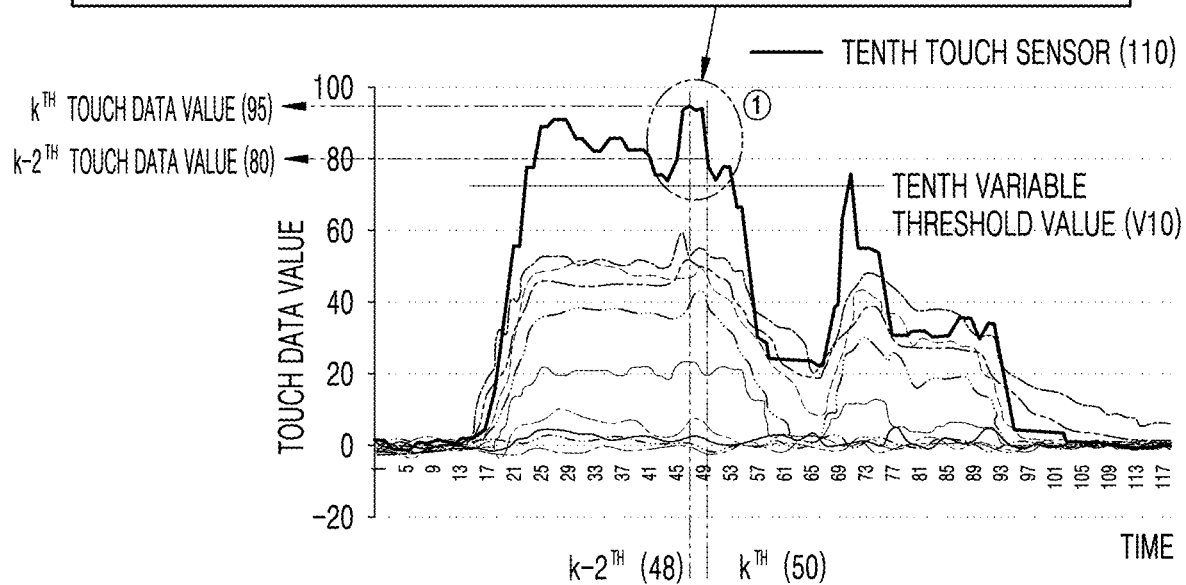
FIG. 20A is an example graph for determining whether or not a touch input is generated, according to a touch data change rate of any one touch sensor from among a plurality of touch sensors according to FIGS. 18 and 19.
Figure 20B:
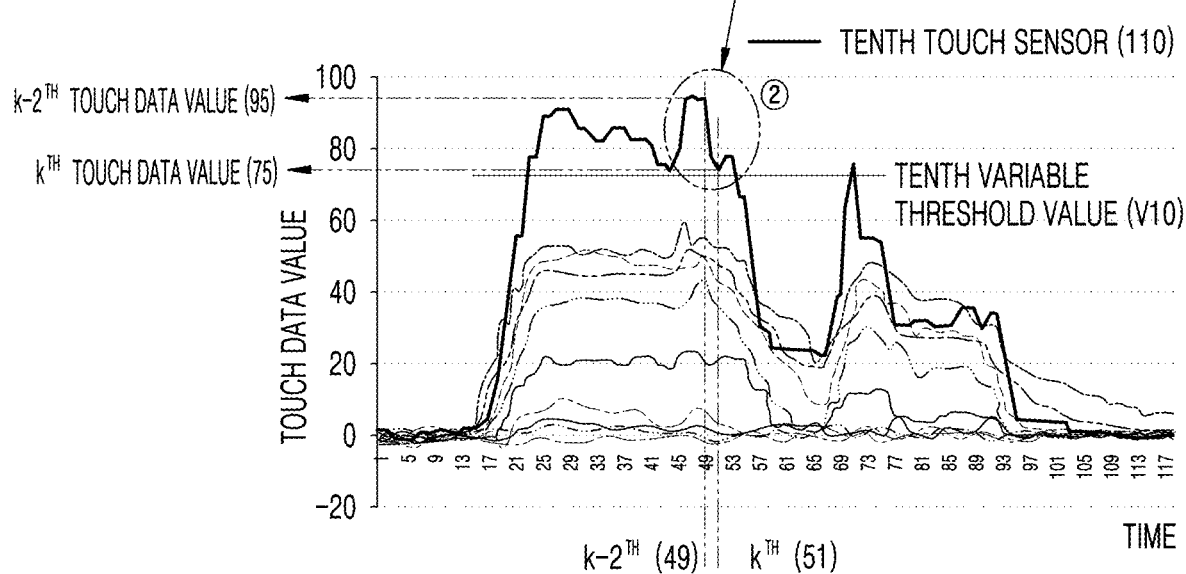
FIG. 20B is an example graph for determining whether or not a touch input is generated, according to a touch data change rate of any one touch sensor from among a plurality of touch sensors according to FIGS. 18 and 19.

FIG. 20A is an example graph for determining whether or not a touch input is generated, according to a touch data change rate of any one touch sensor from among the plurality of touch sensors 100 according to FIGS. 18 and 19. FIG. 20B is an example graph for determining whether or not a touch input is generated, according to a touch data change rate of any one touch sensor from among the plurality of touch sensors 100 according to FIGS. 18 and 19.

Referring to FIGS. 20A and 20B, an X axis indicates a time, and a Y axis indicates touch data values. The touch data values of the first touch sensor 101 to the tenth touch sensor 110, obtained by the processor 1200 when wet steam falls down on the touch panel 1530 of the wireless power transmission apparatus 1000, are illustrated. In this case, a touch data change amount according to time from first touch data value of the first touch sensor 101 to a tenth touch data value of the tenth touch sensor 110 may be slowly increased or decreased.

Hereinafter, operations S1835, S1840, S1845, and S1850 of FIG. 18 are described by, in an embodiment, only the tenth touch data value of the tenth touch sensor 110. Operations S1835, S1840, S1845, and S1850 of FIG. 18 may be substantially the same as operations S1910, S1920, S1925, and S1930 of FIG. 19.

Referring to FIG. 20A, even when the tenth touch data value of the tenth touch sensor 110, increased by wet steam, exceeds a tenth variable threshold value V10 at a predetermined time point, the processor 1200 may ignore the tenth touch data value of the tenth touch sensor 110 at the predetermined time point, when a touch data change rate C of the tenth touch sensor 110 is less than a reference data change rate R_C of the tenth touch sensor 110.

In an embodiment, the processor 1200 may determine that the tenth touch data value of the tenth touch sensor 110 exceeds the tenth variable threshold value V10 at point ① (a time between 48 and 50), for example. The processor 1200 may determine whether or not a touch input is generated, by obtaining a touch data change rate to be described below.

In an embodiment, the processor 1200 may identify the reference data change rate R_C of the tenth touch sensor 110 at point ① (the time between 48 and 50), for example. In an embodiment, the reference data change rate R_C of the tenth touch sensor 110 may be 8. The processor 1200 may identify, from the memory 1600, a reference data change rate of each touch sensor (corresponding to operation S1840 of FIG. 18), for example.

The processor 1200 may obtain the touch data change rate C of the tenth touch sensor 110 at point ① (the time between 48 and 50). The touch data change rate C of the tenth touch sensor 110 may correspond to Equation 2 below (corresponding to S1845 of FIG. 18).

[Equation 2]

touch data change rate $C$ of tenth touch sensor =

$$\frac{(kth \text{ touch data value } (95)) - (k - 2th \text{ touch data value } (80))}{k - (k - 2)} = 7.5$$

The processor 1200 may compare the touch data change rate C of the tenth touch sensor 110 with the reference data change rate R_C of the tenth touch sensor 110 at point ① (the time between 48 and 50) (corresponding to S1850 of FIG. 18).

The processor 1200 may ignore the tenth touch data value of the tenth touch sensor 110, when the touch data change rate C of the tenth touch sensor 110 is less than the reference data change rate R_C of the tenth touch sensor 110 at point ① (the time between 48 and 50) (corresponding to S1830 of FIG. 18). The processor 1200 may determine that a touch input on the tenth touch sensor 110 is abnormal or that a touch input is not generated on the tenth touch sensor 110 and may ignore the touch input with respect to the tenth touch sensor 110.

In an embodiment of the disclosure, even when the tenth touch data value of the tenth touch sensor 110 exceeds the tenth variable threshold value at a predetermined time point, the processor 1200 may determine that an increased touch data value is due to wet steam and may ignore a touch input on the tenth touch sensor 110 at the predetermined time point, when the touch data change amount of the tenth touch sensor 110 is less than a predetermined reference value and has a smooth gradient.

Referring to FIG. 20B, even when the tenth touch data value of the tenth touch sensor 110, increased by the wet steam, exceeds the tenth variable threshold value at a predetermined time point, the processor 1200 may ignore a $k^{th}$ touch data value, when a $k-1^{th}$ touch data value of the tenth touch sensor 110 is ignored (e.g., FIG. 20A). Then, the processor 1200 may not determine whether or not the touch data change rate C of the tenth touch data value of the tenth touch sensor 110 exceeds the reference data change rate R_C of the tenth touch sensor 110.

In an embodiment, the processor 1200 may determine that the tenth touch data value of the tenth touch sensor 110 exceeds the tenth variable threshold value V10 at point ② (a time between 40 and 51), for example.

To determine whether or not a $k^{th}$ touch input on the tenth touch sensor 110 is normal, the processor 1200 may refer to whether or not a touch input is determined to be generated, with respect to a $k-1^{th}$ touch data value of the tenth touch sensor 110.

In an embodiment, the processor 1200 may ignore the $k^{th}$ touch input on the tenth touch sensor 110, when the $k-1^{th}$ touch data value of the tenth touch sensor 110 is ignored due to a shortfall with respect to the reference data change rate R_C (FIG. 20A), for example.

In this case, the processor 1200 may not determine whether or not the touch data change rate C of the tenth touch sensor 110 exceeds the reference data change rate R_C, at point ② (the time between 40 and 51). In an embodiment, the touch data change rate C of the tenth touch sensor 110 may be 10, and the reference data change rate R_C may be 8, and thus, the touch data change rate C may be greater than the reference data change rate R_C, for example. However, the processor 1200 may determine whether or not a touch input is generated, without considering this result.

In an embodiment of the disclosure, when a directly previous touch data change amount of the tenth touch sensor 110 is less than the reference data change rate even when the tenth touch data value of the tenth touch sensor 110 exceeds the tenth variable threshold value at a predetermined time point, the processor 1200 may ignore the tenth touch data value of the tenth touch sensor 110, even when a current touch data change amount is drastically increased or decreased. That is, the processor 1200 may determine that a current touch data value of the tenth touch sensor 110 may be increased or decreased due to wet steam.

Hereinafter, the touch panel 1530 of the wireless power transmission apparatus 1000 in an embodiment of the disclosure will be described with reference to FIGS. 21 and 22.

Figure 21:
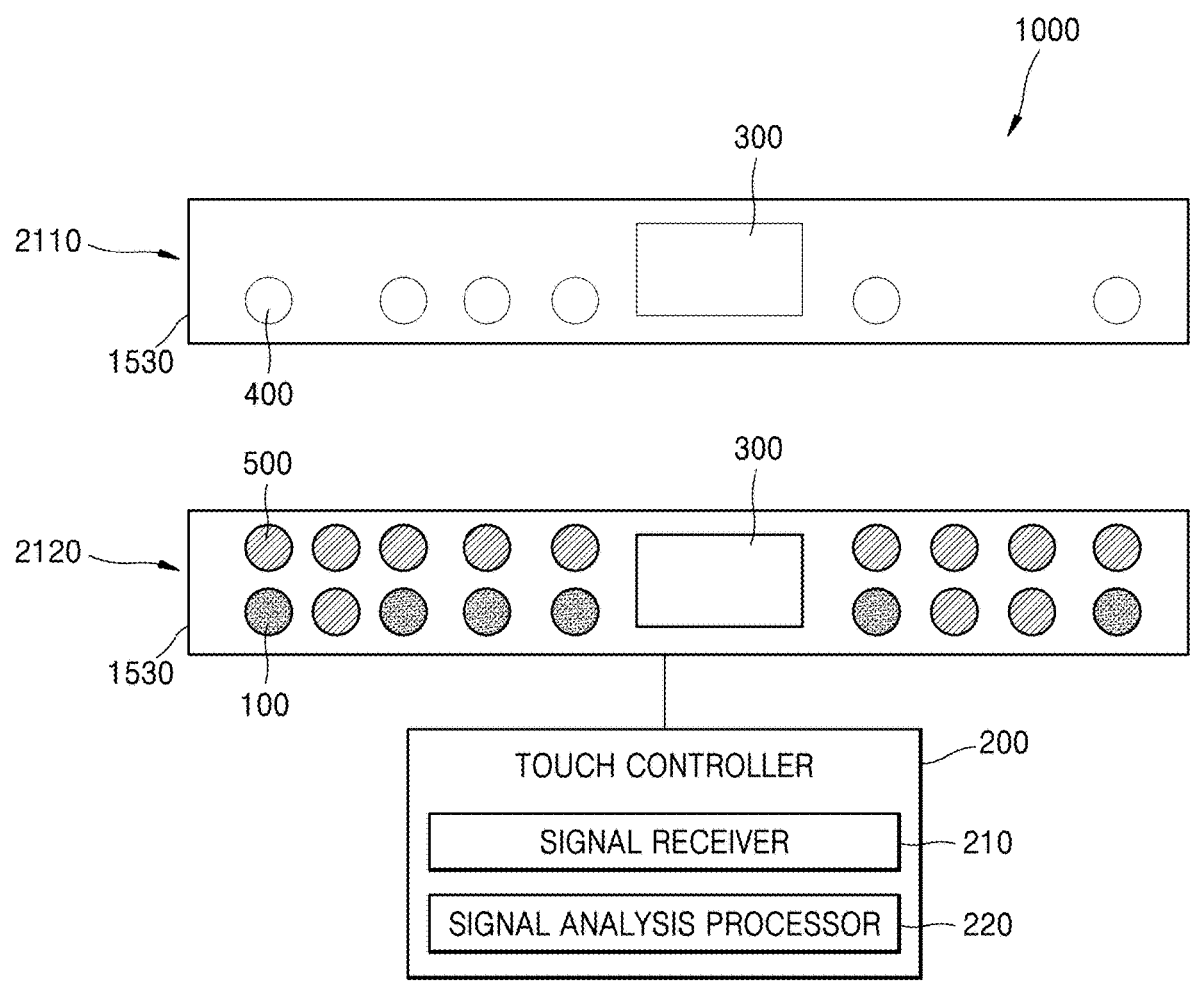
FIG. 21 is a schematic plan view of an embodiment of a touch panel of a wireless power transmission apparatus according to the disclosure.
Figure 22A:
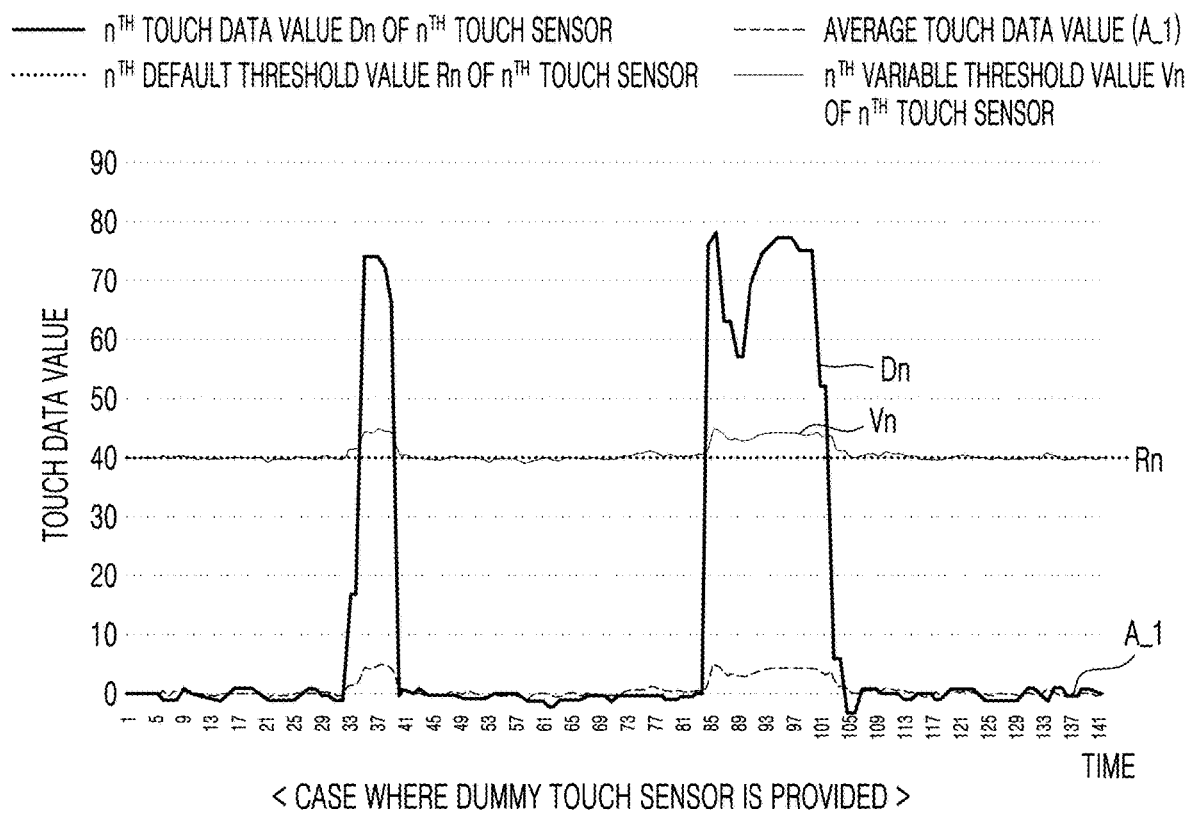
FIG. 22A is a graph of an embodiment of a touch data value of any one touch sensor according to the disclosure.
Figure 22B:
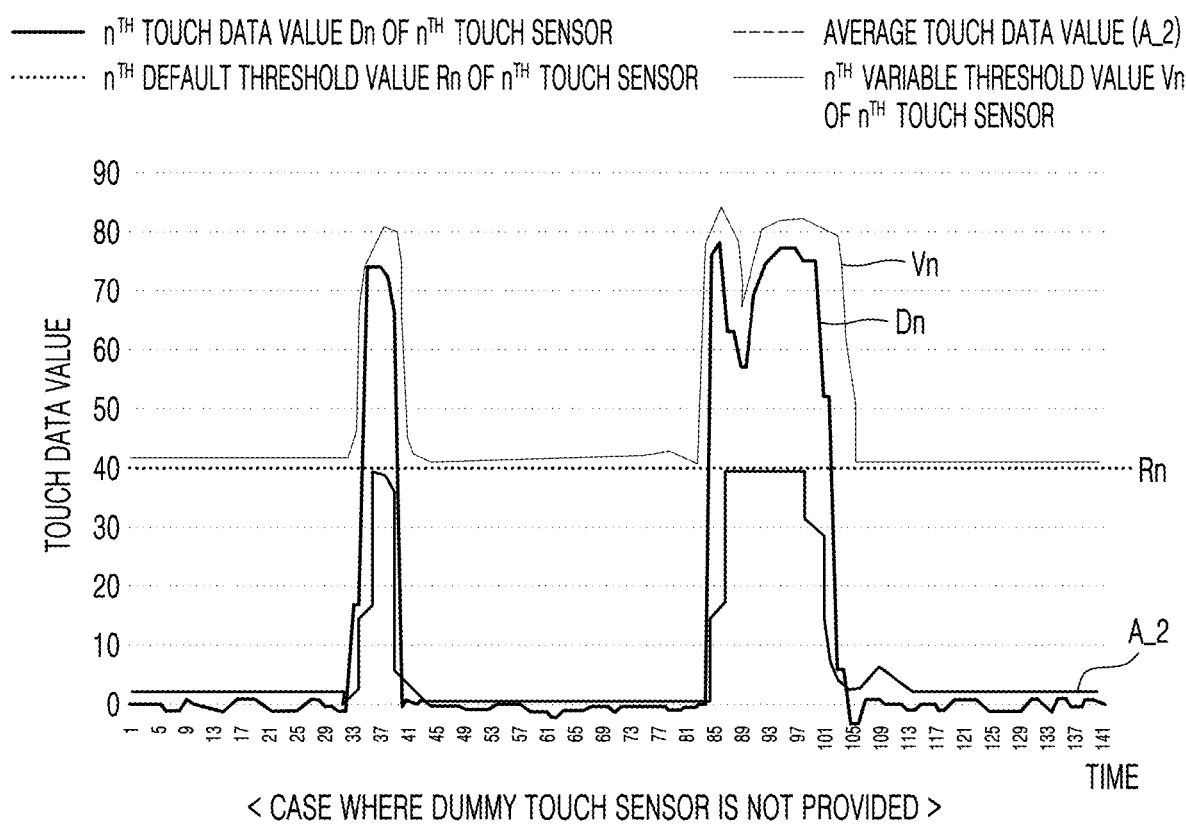
FIG. 22B is an example graph of an embodiment of a touch data value of any one touch sensor according to the disclosure.

FIG. 21 is a schematic plan view of an embodiment of the touch panel 1530 of the wireless power transmission apparatus 1000 according to the disclosure. FIG. 22A is an graph of an embodiment of a touch data value of any one touch sensor according to the disclosure. FIG. 22B is an graph of an embodiment of a touch data value of any one touch sensor according to the disclosure.

Referring to a reference numeral 2110 of FIG. 21, a plurality of touch buttons 400 guiding predetermined functions of the wireless power transmission apparatus 1000 may be provided on a top plate of the wireless power transmission apparatus 1000 in an embodiment of according to the disclosure, and each of the plurality of touch buttons 400 may be connected to at least one touch sensor. The touch buttons 400 may be provided as guide marks on the top plate of the wireless power transmission apparatus 1000. In an embodiment, the touch buttons 400 may include a menu selection button, a confirmation button, a cancellation button, a power level adjustment button, a cooking time reservation button, a cooking pause button, etc., for example, but are not limited thereto.

Referring to a reference numeral 2120 of FIG. 21, the wireless power transmission apparatus 1000 in an embodiment of the disclosure may include at least one dummy touch sensor 500 in addition to the plurality of touch sensors 100. In an embodiment, when the number of touch sensors 100 included in the touch panel 1530 is small, the reliability of an average touch data value may not be high, and thus, the dummy touch sensor 500 may further be disposed on the touch panel 1530, for example. FIG. 21 illustrates a case in which the touch panel 1530 of the wireless power transmission apparatus 1000 includes six touch sensors and twelve dummy touch sensors, but the touch panel 1530 of the wireless power transmission apparatus 1000 is not limited thereto.

In an embodiment of the disclosure, the dummy touch sensor 500 may sense a touch data value according to a change of capacitance, but may not be associated with a predetermined function of the wireless power transmission apparatus 1000. That is, the dummy touch sensor 500 may not be connected with the plurality of touch buttons 400 guiding the predetermined functions, and thus, a user may not recognize the presence of the dummy touch sensor 500.

Even when a user may touch the dummy touch sensor 500, the dummy touch sensor 500 may not have a configured function. The dummy touch sensor 50 may not be mapped with the touch buttons 400 that are touchable. In detail, when there is a user's touch on the dummy touch sensor 500, a touch data value of the dummy touch sensor 500 may be increased according to a change of capacitance. However, even when the touch data value of the dummy touch sensor 500 is increased, the processor 1200 may not have an operation corresponding to a corresponding touch input.

In an embodiment of the disclosure, when the wireless power transmission apparatus 1000 includes the plurality of touch sensors 100 and the at least one dummy touch sensor 500, the average touch data value of the plurality of touch sensors 100 may become stable. Here, that the average touch data value is stable may denote that a range of fluctuation of the average touch data value is small.

In an embodiment, the range of fluctuation of the average touch data value may decrease, as the number of samples for calculating the average value increases, for example. That is, as the number of samples for reference of the average touch data value increases, the stability of the average touch data value may increase.

In an embodiment of the disclosure, the dummy touch sensor 500 may have a dummy touch data value, and the dummy touch data value may be one of the samples of the average touch data value. The wireless power transmission apparatus 1000 may include the dummy touch sensor 500, so that the number of samples of the average touch data value may increase.

Thus, by including the at least one dummy touch sensor 500, the wireless power transmission apparatus 1000 may obtain the average touch data value having a relatively small range of fluctuation and, accordingly, relatively high reliability.

In an embodiment, when there is a user's touch on any one of the plurality of touch sensors 100, a touch data value of the one touch sensor may be drastically increased at a predetermined time point, for example. In an embodiment of the disclosure, when the wireless power transmission apparatus 1000 includes the dummy touch sensor 500, the average touch data value may be stably increased, even when the touch data value of any one touch sensor is greatly increased.

FIG. 22A illustrates an $n^{th}$ touch data value Dn of an $n^{th}$ touch sensor, when the wireless power transmission apparatus 1000 includes the at least one dummy touch sensor 500 so that the total number of touch sensors, for which touch data values may be detected (i.e., the sum of the plurality of touch sensors 100 and the dummy touch sensor 500), has a predetermined value, even when the number of touch sensors 100 included in the wireless power transmission apparatus 1000 is small. Referring to FIG. 22A, when there is a user's touch on the $n^{th}$ touch sensor, the $n^{th}$ touch data value Dn may be greatly increased at a predetermined time point. Even when the $n^{th}$ touch data value Dn of the $n^{th}$ touch sensor is greatly increased at the predetermined time point, an average touch data value A_1 may be stably increased. In other words, a range of fluctuation of the average touch data value A_1 may be small.

On the contrary, a case in which the number of touch sensors 100 included in the wireless power transmission apparatus 1000 is small, and the wireless power transmission apparatus 1000 does not include the dummy touch sensor 500 is described with reference to FIG. 22B.

When there is a user's touch on the $n^{th}$ touch sensor, the $n^{th}$ touch data value Dn may be greatly increased at a predetermined time point. Here, an $n^{th}$ default threshold value Rn of the $n^{th}$ touch sensor may be 40. When the $n^{th}$ touch data value Dn is greatly increased, an average touch data value A_2 may be increased by a great range of fluctuation at the predetermined time point. That is, because the number of samples of the average touch data value A_2 is small, a range of fluctuation of the average touch data value A_2 may be great. Accordingly, a range of fluctuation of an $n^{th}$ variable threshold value Vn may be great.

The disclosure is not limited thereto. However, when the $n^{th}$ variable threshold value Vn is greatly increased, the processor 1200 may determine that the $n^{th}$ touch data value Dn is equal to or less than the $n^{th}$ variable threshold value Vn to incorrectly determine that a touch input is not generated, even when there is a user's touch.

The wireless power transmission apparatus 1000 in an embodiment of the disclosure may include the at least one dummy touch sensor 500 not mapped with the touch buttons 400, in order to obtain a stable average touch data value. Accordingly, even when a range of fluctuation of the touch data value of a touch sensor according to a user's touch is great, a range of fluctuation of the average touch data value and the variable threshold value of the touch sensor may be small. The wireless power transmission apparatus 1000 may have the reliability with respect to determining whether or not a touch input is generated.

The method in an embodiment of the disclosure may be realized in the form of a program command which may be executable by various computing devices and may be recorded on a computer-readable recording medium. The computer-readable recording medium may include program commands, data files, data structures, or the like separately or in combinations. The program commands recorded on the computer-readable recording medium may be specially designed and configured for the disclosure or may be well-known to and usable by one of ordinary skill in the field of computer software. In embodiments, the computer-readable recording medium include magnetic media, such as hard discs, floppy discs, and magnetic tapes, optical media, such as compact disc-read only memories (CD-ROMs) and digital versatile discs (DVDs), magneto-optical media, such as floptical discs, and hardware devices specially configured to store and execute program commands, such as ROMs, RAMs, and flash memories. In embodiments, the program commands include advanced language codes that may be executed by a computer by an interpreter or the like as well as machine language codes made by a compiler.

An embodiment of the disclosure may also be realized in a form of a recording medium including instructions executable by a computer, such as a program module executed by a computer. The computer-readable recording medium may be an arbitrary available medium accessible by a computer and includes all of volatile and non-volatile media and detachable and non-detachable media. Also, the computer-readable recording medium may include both of a computer storage medium and a communication medium. The computer storage recording medium includes all of volatile and non-volatile media and detachable and non-detachable media that are realized by an arbitrary method or technique for storing information, such as computer-readable instructions, data structures, program modules, or other data. The communication medium typically includes computer-readable instructions, data structures, program modules, or other data of modulated data signals, such as carrier waves, or other transmission mechanisms, and includes an arbitrary data transmission mechanism. Also, an embodiment of the disclosure may also be implemented by a computer program or a computer program product including a computer-executable instruction, such as a computer program executable by a computer.

A device-readable storage medium may be provided in a form of a non-transitory storage medium. Here, the "non-transitory storage medium" only denotes a tangible device, not including a signal (e.g., electromagnetic waves), and the term does not distinguish a case where data is stored in the storage medium semi-permanently from a case where data is stored in the storage medium temporarily. In an embodiment, the "non-transitory storage medium" may include a buffer in which data is temporarily stored, for example.

The method in an embodiment of the disclosure may be provided to be included in a computer program product. The computer program product may be transacted between a seller and a purchaser. The computer program product may be distributed in the form of a device-readable storage medium (e.g., a CD-ROM), or may be distributed online (e.g., download or upload), through an application store (e.g., Play Store™) or directly between two user devices (e.g., smartphones). In the case of the online distribution, at least a part of the computer program product (e.g., a downloadable application) may be at least temporarily stored in a machine-readable storage medium, such as a server of a manufacturer, a server of an application store, or a memory of a relay server, or may be temporarily generated.

In an embodiment of the disclosure, there are provided a wireless power transmission apparatus including a user interface and being capable of determining that a touch input is not generated, even when a capacitance of a touch sensor changes due to a user's abnormal touch that is not intended, and a method, performed by the wireless power transmission apparatus, of determining whether or not a touch input is generated.

The wireless power transmission apparatus 1000 in an embodiment of the disclosure may include the user interface 1500 configured to receive a user's input through the plurality of touch sensors 100, the memory 1600, and the at least one processor 1200. The at least one processor 1200 may obtain touch data values corresponding to the plurality of touch sensors 100, respectively. The at least one processor 1200 may obtain an average touch data value of the plurality of touch sensors 100, based on the touch data values. The at least one processor 1200 may determine a variable threshold value with respect to at least one touch sensor from among the plurality of touch sensors 100, the variable threshold value being obtained by adding, to the average touch data value, a default threshold value corresponding to the at least one touch sensor. The at least one processor 1200 may determine whether or not a touch input is generated on the at least one touch sensor, based on a result of comparing a touch data value of the at least one touch sensor with the variable threshold value of the at least one touch sensor.

The wireless power transmission apparatus 1000 in an embodiment of the disclosure may determine whether or not a touch input is generated based on the variable threshold value taking into account changed touch data values of the plurality of touch sensors 100, and thus, a malfunction of the wireless power transmission apparatus 1000, due to a user's unintentional touch, may be minimized.

The at least one processor 1200 may determine that a touch input with respect to at least one touch sensor is normal, when a touch data value of the at least one touch sensor exceeds a variable threshold value of the at least one touch sensor, and may determine that a touch input with respect to at least one touch sensor is abnormal, when a touch data value of the at least one touch sensor is equal to or less than a variable threshold value of the at least one touch sensor.

The variable threshold value with respect to the at least one touch sensor may be greater than a default threshold value with respect to the at least one touch sensor.

The touch data values of the plurality of touch sensors 100 may be changed according to changing capacitances based on a touch.

The user interface 1500 may include the first touch sensor group 100-1 including the plurality of touch sensors 100 connected to the first touch controller 200-1 and the second touch sensor group 100-2 including the plurality of touch sensors 100 connected to the second touch controller 200-2. The at least one processor 1200 may obtain a first average touch data value based on the touch data values of the first touch sensor group 100-1, the touch data values of the first touch sensor group 100-1 being provided from the first touch controller 200-1. The at least one processor 1200 may obtain a second average touch data value based on the touch data values of the second touch sensor group 100-2, the touch data values of the second touch sensor group 100-2 being provided from the second touch controller 200-2.

When at least one touch sensor is included in the first touch sensor group 100-1, the at least one processor 1200 may determine a first variable threshold value obtained by adding, to a default threshold value with respect to the at least one touch sensor, the first average touch data value. The at least one processor 1200 may determine whether or not a touch input is generated on the at least one touch sensor, by comparing the touch data value with respect to the at least one touch sensor with the first variable threshold value. When at least one touch sensor is included in the second touch sensor group 100-2, the at least one processor 1200 may determine a second variable threshold value obtained by adding, to a default threshold value with respect to the at least one touch sensor, the second average touch data value. The at least one processor 1200 may determine whether or not a touch input is generated on the at least one touch sensor, by comparing the touch data value with respect to the at least one touch sensor with the second variable threshold value.

The first average touch data value may be different from the second average touch data value.

The at least one processor 1200 may obtain a touch data change rate, which is a touch data change amount per unit time of at least one touch sensor. The at least one processor 1200 may compare the touch data change rate with a reference data change rate of the at least one touch sensor, and when the touch data change rate is less than the reference data change rate, the at least one processor 1200 may determine that a touch input with respect to the at least one touch sensor is abnormal.

The wireless power transmission apparatus 1000 in an embodiment of the disclosure may determine whether or not a touch input is generated, by taking into account the touch data change rate of the plurality of touch sensors 100, and thus, a malfunction of the wireless power transmission apparatus 1000, due to a user's unintentional touch, may be minimized.

The at least one processor 1200 may obtain the touch data change rate of at least one touch sensor by a $k^{th}$ (k is an integer equal to or greater than 3) touch data value and a $k-2^{th}$ touch data value of the at least one touch sensor.

When the touch data change rate based on a directly previous touch data value of at least one touch sensor is less than the reference data change rate of the at least one touch sensor, the at least one processor 1200 may determine that a touch input according to a current touch data value of the at least one touch sensor is abnormal.

The user interface 1500 may include the touch controller 200 configured to provide, to the at least one processor 1200, the touch data value of each of the plurality of touch sensors 100. The touch controller 200 may include the signal receiver 210 configured to receive a change of capacitance of the plurality of touch sensors 100, and the signal analysis processor 220 configured to output, to the at least one processor 1200, the touch data values corresponding to the plurality of touch sensors 100, respectively, according to changing charging times based on the change of capacitance of the plurality of touch sensors 100.

The user interface 1500 may include the at least one dummy touch sensor 500 not mapped with the touch buttons 400 that are touchable. The at least one processor 1200 may obtain an average touch data value of the touch data values corresponding to the plurality of touch sensors 100, respectively, and a touch data value corresponding to the at least one dummy touch sensor 500.

The wireless power transmission apparatus 1000 in an embodiment of the disclosure may include the at least one dummy touch sensor 500, and thus, the average touch data value has a relatively small range of fluctuation. Thus, the reliability of the wireless power transmission apparatus 1000 with respect to determining whether or not a touch input is generated may be increased.

The method, performed by the wireless power transmission apparatus 1000, of determining whether or not a touch input is generated, in an embodiment of the disclosure may include obtaining touch data values corresponding to the plurality of touch sensors 100, respectively, obtaining an average touch data value of the plurality of touch sensors 100, based on the touch data values, determining a variable threshold value with respect to at least one touch sensor from among the plurality of touch sensors 100, the variable threshold value being obtained by adding, to the average touch data value, a default threshold value corresponding to the at least one touch sensor, and based on a result of comparing the touch data value with respect to the at least one touch sensor with the variable threshold value with respect to the at least one touch sensor, determining whether or not a touch input is generated on the at least one touch sensor.

By using the method, performed by the wireless power transmission apparatus 1000, of determining whether or not a touch input is generated, in an embodiment according to the disclosure, determination with respect to whether or not a touch input is generated may be performed based on the variable threshold value taking into account the changed touch data values of the plurality of touch sensors 100. Thus, a malfunction of the wireless power transmission apparatus 1000 due to a user's unintentional touch may be minimized.

The determining of whether or not a touch input is generated on the at least one touch sensor may include determining that a touch input with respect to the at least one touch sensor is normal, when the touch data value with respect to the at least one touch sensor exceeds the variable threshold value with respect to the at least one touch sensor, and determining that a touch input with respect to the at least one touch sensor is abnormal, when the touch data value with respect to the at least one touch sensor is equal to or less than the variable threshold value with respect to the at least one touch sensor.

The user interface 1500 of the wireless power transmission apparatus 1000 may include the first touch sensor group 100-1 including the plurality of touch sensors 100 connected to the first touch controller 200-1 and the second touch sensor group 100-2 including the plurality of touch sensors 100 connected to the second touch controller 200-2. The obtaining of the average touch data value may include obtaining a first average touch data value based on the touch data values of the first touch sensor group 100-1, the touch data values of the first touch sensor group 100-1 being provided from the first touch controller 200-1, and obtaining a second average touch data value based on the touch data values of the second touch sensor group 100-2, the touch data values of the second touch sensor group 100-2 being provided from the second touch controller 200-2.

The determining of whether or not a touch input is generated on the at least one touch sensor may include obtaining a touch data change rate, which is a touch data change amount per unit time of the at least one touch sensor, and, by comparing the touch data change rate with a reference data change rate of the at least one touch sensor, determining that a touch input with respect to the at least one touch sensor is abnormal, when the touch data change rate is less than the reference data change rate.

The identifying of the touch data change rate of the at least one touch sensor may include obtaining the touch data change rate of the at least one touch sensor by a $k^{th}$ touch data value and a $k-2^{th}$ touch data value of the at least one touch sensor.

The determining of whether or not a touch input is generated on the at least one touch sensor may include determining that a touch input according to a current touch data value of the at least one touch sensor is abnormal, when the touch data change rate based on a directly previous touch data value of the at least one touch sensor is less than the reference data change rate of the at least one touch sensor.

By using the method, performed by the wireless power transmission apparatus 1000, of determining whether or not a touch input is generated, in an embodiment according to the disclosure, determination with respect to whether or not a touch input is generated may be performed by taking into account the touch data change rate of the plurality of touch sensors 100. Thus, a malfunction of the wireless power transmission apparatus 1000, due to a user's unintentional touch, may be minimized.

The obtaining of the touch data values corresponding to the plurality of touch sensors 100, respectively, may include receiving, via the touch controller 200 configured to provide the touch data value of each of the plurality of touch sensors 100 to the at least one processor 1200, a change of capacitance of the plurality of touch sensors 100, and outputting, via the touch controller 200, the touch data values corresponding to the plurality of touch sensors 100, respectively, to the at least one processor 1200, based on charging times changed according to the change of capacitance of the plurality of touch sensors 100.

The wireless power transmission apparatus 1000 may include the at least one dummy touch sensor 500 not mapped with the touch buttons 400 that are touchable. The obtaining of the average touch data value may include obtaining an average of the touch data values corresponding to the plurality of touch sensors, respectively, and a touch data value of the at least one dummy touch sensor 500.

The method, performed by the wireless power transmission apparatus 1000, of determining whether or not a touch input is generated, in an embodiment according to the disclosure, may include the at least one dummy touch sensor 500, and thus, a range of fluctuation of the average touch data value may not be great. Accordingly, the wireless power transmission apparatus 1000 may have an improved reliability for determining whether or not a touch input is generated.

It should be understood that embodiments described herein should be considered in a descriptive sense only and not for purposes of limitation. Descriptions of features or advantages within each embodiment should typically be considered as available for other similar features or advantages in other embodiments. While embodiments have been described with reference to the drawing figures, it will be understood by those of ordinary skill in the art that various changes in form and details may be made therein without departing from the spirit and scope as defined by the following claims.

The invention claimed is:

1. A wireless power transmission apparatus comprising:
a user interface configured to receive a user input through a plurality of touch sensors;
a memory; and
a processor configured to:
obtain touch data values corresponding to the plurality of touch sensors, respectively;
obtain an average touch data value of the plurality of touch sensors, based on the touch data values;
determine a variable threshold value with respect to a touch sensor from among the plurality of touch sensors, the variable threshold value being obtained by adding, to the average touch data value, a default threshold value corresponding to the touch sensor; and
determine whether or not a touch input is generated with respect to the touch sensor, based on a result of comparing a touch data value with respect to the touch sensor with the variable threshold value with respect to the touch sensor.

2. The wireless power transmission apparatus of claim 1, wherein the processor is further configured to:
in according to the touch data value with respect to the touch sensor exceeding the variable threshold value with respect to the touch sensor, determine that the touch input with respect to the touch sensor is normal; and
in according to the touch data value with respect to the touch sensor being equal to or less than the variable threshold value with respect to the touch sensor, determine that the touch input with respect to the touch sensor is abnormal.

3. The wireless power transmission apparatus of claim 1, wherein the user interface comprises:
a first touch sensor group comprising a plurality of first touch sensors connected to a first touch controller among the plurality of touch sensors; and
a second touch sensor group comprising a plurality of second touch sensors connected to a second touch controller among the plurality of touch sensors, and
the processor is further configured to
obtain a first average touch data value, based on touch data values of the first touch sensor group, the touch data values of the first touch sensor group being provided from the first touch controller, and obtain a second average touch data value, based on touch data values of the second touch sensor group, the touch data values of the second touch sensor group being provided from the second touch controller.

4. The wireless power transmission apparatus of claim 3, wherein the processor is further configured to:
in according to the touch sensor being included in the first touch sensor group, determine a first variable threshold value obtained by adding, to the default threshold value with respect to the touch sensor, the first average touch data value and compare the touch data value with respect to the touch sensor with the first variable threshold value to determine whether or not a touch input is generated with respect to the touch sensor; and
in according to the touch sensor being included in the second touch sensor group, determine a second variable threshold value obtained by adding, to the default threshold value with respect to the touch sensor, the second average touch data value and compare the touch data value with respect to the touch sensor with the second variable threshold value to determine whether or not a touch input is generated with respect to the touch sensor.

5. The wireless power transmission apparatus of claim 1, wherein the processor is further configured to:
obtain a touch data change rate, which is a touch data change amount per unit time of the touch sensor; and
compare the touch data change rate with a reference data change rate of the touch sensor, and in according to the touch data change rate being less than the reference data change rate, determine that the touch input with respect to the sensor is abnormal.

6. The wireless power transmission apparatus of claim 5, wherein the processor is further configured to obtain the touch data change rate of the touch sensor by a kth (k is an integer greater than or equal to 3) touch data value and a k−2th touch data value of the touch sensor.

7. The wireless power transmission apparatus of claim 5, wherein the processor is further configured to, in according to the touch data change rate based on a directly previous touch data value of the touch sensor being less than the reference data change rate of the touch sensor, determine that a touch input according to a current touch data value of the touch sensor is abnormal.

8. The wireless power transmission apparatus of claim 1, wherein the user interface comprises a dummy touch sensor not mapped with a touchable touch button, and the processor is further configured to obtain an average touch data value of the touch data values corresponding to the plurality of touch sensors, respectively, and a touch data value corresponding to the dummy touch sensor.

9. A method, performed by a wireless power transmission apparatus, of determining whether or not a touch input is generated, the method comprising:

obtaining touch data values corresponding to a plurality of touch sensors, respectively;

obtaining an average touch data value of the plurality of touch sensors, based on the touch data values;

determining a variable threshold value with respect to a touch sensor from among the plurality of touch sensors, the variable threshold value being obtained by adding, to the average touch data value, a default threshold value corresponding to the touch sensor; and determining whether or not a touch input is generated with respect to the touch sensor, based on a result of comparing a touch data value with respect to the touch sensor with the variable threshold value with respect to the touch sensor.

10. The method of claim 9, wherein the determining whether or not a touch input is generated with respect to the touch sensor comprises:

in according to the touch data value with respect to the touch sensor exceeding the variable threshold value with respect to the touch sensor, determining that the touch input with respect to the touch sensor is normal; and in according to the touch data value with respect to the touch sensor being equal to or less than the variable threshold value with respect to the touch sensor, determining that the touch input with respect to the touch sensor is abnormal.

11. The method of claim 9, wherein a user interface of the wireless power transmission apparatus comprises:

a first touch sensor group comprising a plurality of first touch sensors connected to a first touch controller among the plurality of touch sensors; and a second touch sensor group comprising a plurality of second touch sensors connected to a second touch controller among the plurality of touch sensors, and the obtaining the average touch data value comprises obtaining a first average touch data value, based on touch data values of the first touch sensor group, the touch data values of the first touch sensor group being provided from the first touch controller, and obtaining a second average touch data value, based on touch data values of the second touch sensor group, the touch data values of the second touch sensor group being provided from the second touch controller.

12. The method of claim 9, wherein the determining whether or not a touch input is generated with respect to the touch sensor comprises:

obtaining a touch data change rate, which is a touch data change amount per unit time of the touch sensor; and comparing the touch data change rate with a reference data change rate of the touch sensor, and in according to the touch data change rate being less than the reference data change rate, determining that the touch input with respect to the sensor is abnormal.

13. The method of claim 12, wherein the identifying the touch data change rate of the touch sensor comprises obtaining the touch data change rate of the touch sensor by a kth (k is an integer greater than or equal to 3) touch data value and a k−2th touch data value of the touch sensor.

14. The method of claim 12, wherein the determining whether or not a touch input is generated with respect to the touch sensor comprises, in according to the touch data change rate based on a directly previous touch data value of the touch sensor being less than the reference data change rate of the touch sensor, determining that a touch input according to a current touch data value of the touch sensor is abnormal.

15. The method of claim 9, wherein the wireless power transmission apparatus further comprises a dummy touch sensor not mapped with a touchable touch button, and the obtaining the average touch data value comprises obtaining an average of the touch data values corresponding to the plurality of touch sensors, respectively, and a touch data value corresponding to the dummy touch sensor.

* * * * *